US00RE34183E

United States Patent [19]

Wilens et al.

[11] E Patent Number: Re. 34,183

[45] Reissued Date of Patent: Feb. 23, 1993

[54] IGNITION CONTROL SYSTEM FOR INTERNAL COMBUSTION ENGINES WITH SIMPLIFIED CRANKSHAFT SENSING AND IMPROVED COIL CHARGING

[75] Inventors: David I. Wilens, Herndon; Alexander Long, III, Oakton, both of Va.

[73] Assignee: Electromotive Inc., Chantilly, Va.

[21] Appl. No.: 617,087

[22] Filed: Nov. 23, 1990

Related U.S. Patent Documents

Reissue of:

[64] Patent No.: 4,787,354
Issued: Nov. 29, 1988
Appl. No.: 826,331
Filed: Feb. 5, 1986

[51] Int. Cl.[5] ..... F02P 5/145

[52] U.S. Cl. ..... 123/414; 123/609; 123/417; 328/120

[58] Field of Search ..... 123/414, 415, 416, 417, 123/418, 609, 618, 643, 644; 73/116, 117.3; 324/167, 168; 364/431.03, 431.04; 328/120

[56] References Cited

U.S. PATENT DOCUMENTS

| | | | |
|---|---|---|---|
| 3,605,712 | 9/1971 | Ford | 123/146.5 A |
| 3,710,131 | 1/1973 | Ford | 307/10 R |
| 3,738,339 | 6/1973 | Huntzinger et al. | 123/416 |
| 3,789,816 | 2/1974 | Taplin et al. | 123/436 |
| 3,815,561 | 6/1974 | Seitz | 123/489 |
| 3,815,566 | 6/1974 | Staggs | 123/275 |
| 3,875,912 | 4/1975 | Bullo | 123/425 |
| 3,888,220 | 6/1975 | Bigalke et al. | 123/340 |
| 3,896,776 | 7/1975 | Ford | 123/416 |
| 3,897,766 | 8/1975 | Pratt, Jr. et al. | 123/146.5 A |
| 3,915,131 | 10/1975 | Brungsberg | 123/414 |
| 3,921,610 | 11/1975 | Hartig | 123/416 |
| 3,923,022 | 12/1975 | Scholl | 123/415 |

(List continued on next page.)

FOREIGN PATENT DOCUMENTS

| | | | |
|---|---|---|---|
| 2347839 | 4/1975 | Fed. Rep. of Germany . | |
| 2204226 | 5/1974 | France . | |
| 2355165 | 1/1978 | France . | |
| 2422043 | 11/1979 | France . | |
| 58-0038375 | 3/1983 | Japan . | |
| 0038375 | 3/1983 | Japan | 123/414 |
| 58-62364A | 4/1983 | Japan . | |
| 60-125756 | 7/1985 | Japan . | |
| 2065310A | 6/1981 | United Kingdom . | |
| 2142436A | 1/1985 | United Kingdom . | |

OTHER PUBLICATIONS

Freimark, Cost Effective Engine Controls, SAE Tech- (List continued on next page.)

*Primary Examiner*—Willis R. Wolfe, Jr.
*Attorney, Agent, or Firm*—Nixon & Vanderhye

[57] ABSTRACT

An electronic ignition system is disclosed for controlling as a function of at least one selected engine parameter the ignition or spark instants of an internal combustion engine having at least one cylinder with a piston and a rotatable crankshaft coupled to the piston to be rotatably driven as combustions occur within the cylinder at spark instant. The crankshaft has at least one reference position defining a positional relationship of the crankshaft to the cylinder. The electronic ignition system comprises a rotor fixed to rotate with the crankshaft and having a plurality of reference indicia thereon positionally related with respect to the reference position. The reference indicia are disposed at points equally spaced from each other by a predetermined arc of crankshaft rotation about the rotor. At least one of the points has a missing indicium and is disposed in a predetermined relation to the reference position of the crankshaft. A single sensor is disposed at a point fixed in relation to the rotation of the crankshaft for providing a train of sensor signals, each signal occurring in time when each of the plurality of reference indicia rotates past the fixed point. The missing indicium is determined by circuitry responsive to each sensor signal for measuring the arc of crankshaft rotation from the current, corresponding reference indicium and, if the measured arc is greater than the predetermined arc, for providing a missing indicium signal.

123 Claims, 7 Drawing Sheets

U.S. PATENT DOCUMENTS

| | | | |
|---|---|---|---|
| 3,930,201 | 12/1975 | Ackermann et al. | 328/1 |
| 3,935,538 | 1/1976 | Kizler et al. | 328/38 |
| 3,937,193 | 2/1976 | Kim | 123/611 |
| 3,943,898 | 3/1976 | Kiencke | 123/416 |
| 3,946,709 | 3/1976 | Monpetit | 123/416 |
| 3,955,723 | 5/1976 | Richards | 123/416 |
| 3,957,023 | 5/1976 | Peterson | 123/425 |
| 3,977,373 | 8/1976 | Sand | 123/425 |
| 3,981,282 | 9/1976 | Ford | 123/416 |
| 4,002,155 | 1/1977 | Harned et al. | 123/425 |
| 4,008,698 | 2/1977 | Gartner | 123/611 |
| 4,015,566 | 4/1977 | Wahl | 123/415 |
| 4,018,197 | 4/1977 | Salway | 123/416 |
| 4,018,202 | 4/1977 | Gartner | 123/609 |
| 4,019,484 | 4/1977 | Mori | 123/611 |
| 4,026,251 | 5/1977 | Schweitzer et al. | 123/436 |
| 4,044,234 | 11/1977 | Frobenius et al. | 235/150.21 |
| 4,044,236 | 8/1977 | Bianchi et al. | 235/150.21 |
| 4,051,766 | 4/1977 | Petersen | 229/2.5 EC |
| 4,063,539 | 12/1977 | Gorille et al. | 123/416 |
| 4,099,495 | 7/1978 | Kiencke et al. | 123/480 |
| 4,107,997 | 8/1978 | Snaper | 73/304 R |
| 4,112,895 | 9/1978 | Habert | 123/418 |
| 4,121,556 | 10/1978 | Bigliani et al. | 123/610 |
| 4,122,814 | 10/1978 | Ford | 123/618 |
| 4,126,107 | 11/1978 | Harada et al. | 123/492 |
| 4,127,092 | 11/1978 | Fresow et al. | 123/416 |
| 4,130,096 | 12/1978 | Ford | 123/425 |
| 4,132,210 | 1/1979 | Long | 123/179.16 |
| 4,133,323 | 1/1979 | Adler | 123/416 |
| 4,145,608 | 3/1979 | Shirasaki et al. | 250/231 SE |
| 4,152,655 | 4/1979 | Przybyla et al. | 328/120 |
| 4,162,666 | 7/1979 | Maioglio | 123/416 |
| 4,167,923 | 9/1979 | Iwase et al. | 123/416 |
| 4,167,928 | 9/1979 | Pagel | 123/643 |
| 4,169,438 | 10/1979 | Iwase et al. | 123/416 |
| 4,175,506 | 11/1979 | Sakamoto et al. | 123/416 |
| 4,175,507 | 11/1979 | Kawai et al. | 123/416 |
| 4,178,893 | 12/1979 | Aoki | 123/416 |
| 4,181,884 | 1/1980 | Shirasaki et al. | 324/208 |
| 4,191,912 | 3/1980 | Gerry | 315/209 R |
| 4,197,767 | 4/1980 | Leung | 74/860 |
| 4,198,936 | 4/1980 | Pagel et al. | 123/609 |
| 4,203,404 | 5/1980 | Canup | 123/643 |
| 4,208,992 | 6/1980 | Polo | 123/415 |
| 4,232,368 | 11/1980 | Hill et al. | 123/416 |
| 4,233,592 | 11/1980 | Leichle | 340/347 P |
| 4,248,195 | 2/1981 | Gorille | 123/416 |
| 4,249,493 | 2/1981 | Honig et al. | 123/416 |
| 4,250,858 | 2/1981 | Jeenicke et al. | 123/480 |
| 4,254,748 | 3/1981 | Lewis | 123/416 |
| 4,262,251 | 4/1981 | Fujishiro et al. | 324/208 |
| 4,262,526 | 4/1981 | Makita et al. | 73/116 |
| 4,262,643 | 4/1981 | Cavil et al. | 123/416 |
| 4,265,210 | 5/1981 | Hanisko | 123/490 |
| 4,265,211 | 5/1981 | Meloeny | 123/643 |
| 4,273,089 | 6/1981 | Maier | 123/417 |
| 4,292,943 | 10/1981 | Kyogoku et al. | 123/427 |
| 4,300,518 | 11/1981 | Petrie | 123/609 |
| 4,311,962 | 1/1982 | Titsworth | 328/120 |
| 4,321,580 | 3/1982 | Deleris | 340/870.24 |
| 4,328,775 | 5/1982 | Ironside | 123/339 |
| 4,338,813 | 7/1982 | Hunninghaus et al. | 73/116 |
| 4,338,903 | 7/1982 | Bolinger | 123/476 |
| 4,345,209 | 8/1982 | Walker | 328/120 |
| 4,355,613 | 10/1982 | Rode et al. | 123/414 |
| 4,356,447 | 10/1982 | Honig et al. | 324/169 |
| 4,376,429 | 3/1983 | Youngblood | 123/425 |
| 4,378,778 | 4/1983 | Harter | 123/609 |
| 4,382,430 | 5/1983 | Iwasaki | 123/606 |
| 4,406,265 | 9/1983 | Brandt et al. | 123/425 |
| 4,414,946 | 11/1983 | Daumer et al. | 123/417 |
| 4,426,974 | 1/1984 | Nash | 123/418 |
| 4,434,770 | 3/1984 | Nishimura et al. | 123/494 |
| 4,459,968 | 7/1984 | Brandt et al. | 123/643 |
| 4,462,380 | 7/1984 | Asik | 123/620 |
| 4,478,201 | 10/1984 | Asik | 123/620 |
| 4,485,784 | 12/1984 | Fujii et al. | 123/416 |
| 4,493,306 | 1/1985 | Asik | 123/620 |
| 4,494,509 | 1/1985 | Long | 123/416 |
| 4,538,585 | 9/1985 | Arguello et al. | 123/609 |
| 4,548,174 | 10/1985 | Anderson | 123/310 |
| 4,553,208 | 11/1985 | Akiyama et al. | 364/431.05 |
| 4,553,426 | 11/1985 | Capurka | 73/116 |
| 4,553,427 | 11/1985 | Kuraoka et al. | 73/117.3 |
| 4,558,684 | 12/1985 | Caddy et al. | 123/609 |
| 4,562,812 | 1/1986 | Chauvel | 123/417 |
| 4,574,756 | 3/1986 | Ito et al. | 123/357 |
| 4,628,269 | 12/1986 | Hunninghaus et al. | 328/120 |
| 4,649,881 | 3/1987 | Long | 123/418 |
| 4,656,993 | 4/1987 | Yuzawa et al. | |
| 4,707,791 | 11/1987 | Hmelovsky et al. | 364/431.04 |
| 4,787,354 | 11/1988 | Wilens et al. | 123/414 |

OTHER PUBLICATIONS nical Paper Series 810157, Internt'l Congress and Exposition, Cobo Hall, Detroit, Mich., 16-page booklet, Feb. 23-27, 1981.

"The Electronics Revolution, Part I", 34 *Road & Track* No. 3, pp. 52-56, Nov. 1982.

"Electronics, Part II", 34 *Road & Track* No. 4, pp. 154-157, Dec. 1982.

Evernham et al., "MISAR—The Microprocessor Controlled Ignition System," 780666, Technical Paper Series, Society of Automotive Engineers, 400 Commonwealth Dr., Warrendale, Pa. 15096, 16-page booklet, (Apr. 14, 1977).

"Electronic Engine Control I (EECI) System", Engine 2 *1979 Car Shop Manual*, pp. 29-06-01 through 29-0-6-16, Ford, (Jan. 1979).

"Engine Controls Become More Cost Effective," 00989-2571/81/8908-0028, 89 *Society of Automotive Engineers, Inc.*, No. 8, pp. 28-335, (Aug. 1981).

Section C4, Direct Ignition System (DIS)/EST-2.5L, Driveability and Emissions—Fuel Injection (TBI) 6E2-C4-1, *1987 Grand AM Service Manual*, General Motors Corp., (Nov. 1986).

*1984 Buick All Series Chassis Service Manual*, General Motors Corporation, Buick Motor Div., Flint, Mich., 5 pages, (Jun. 13, 1983).

*1985 Buick Chassis Service Manual*, General Motors Corporation, Buick Motor Div., Flint, Mich., pp. 6E-3-301 through 6E3-313, (Jun. 27, 1984).

J. C. Cook II, "Application of A Crankshaft Position Sensor to Control Engine Timing", 780213, Technical Paper Series, Society of Automotive Engineers, 400 Commonwealth Dr., Warrendale, Pa., 15096, pp. 53-64, Feb. 27-Mar. 3, 1978.

"Electronic Engine Control (EEC) System," Engine 2 *1978 Car Shop Manual*, pp. 29-06-01 through 29-06-11, Ford, (Jan. 1978); and (List continued on next page.)

OTHER PUBLICATIONS

Kovener, "A Low Cost Electronic Ignition Control System with a 4-Bit Microcontroller", 820256, National Semiconductor Corp., pp. 27-32 (Jan. 1981).

Motorola, MC69HC11AB, Section 8, Programmable Timer, Real Time Interrupt, and Pulse Accumulator, pp. 8-1 and 8-7, (May 15, 1990).

Sellner, "Electronic Mapped Ignition System with Knock Control", *VDI Reports No. 515,* Paper, (Jan. 1984).

d'Orsay et al., "New Components and Recent Developments in Ignition Systems", Second International Conference on Automotive Electronics (Nov. 2, 1979).

Randall et al., "Closed Loop Control of Internal Combustion Engine Efficiency and Exhaust Emission", *Final Report No. SUDAAR503,* May 1976.

Cook, Application of a Crankshaft Position Sensor to Control Engine Timing, SAE Technical Paper 780213, Feb. 27, 1978.

4 CYLINDER ENGINE 2 COILS
SPU. X60-2-(HR-2)-X58
TWO MISSING PULSES
FVCO 1,536 PER REV.
MISSING PULSE COUNTER
2^6 OF MISSING PULSE COUNTER
DECODED 58TH PULSE SYNCH. COUNTER
ERROR LIMITER COUNTER < 150 RPM
LOW SPEED MISSING PULSE LSP
ERROR LIMITER COUNTER > 150 RPM
NO RUN COUNTER
360° (C.S.)
180° (C.S.)
TYP.
6° ON CS
2 MISSING PULSES
60° BTDC
6°B TDC #1
6°B TDC #2
25.5 PULSES PER HOUR
76.5 P/2 mp.

60° BTDC
12° BTDC
TOP DEAD CENTER (TDC)
REDUNDENT FIRE $\overline{BK}$ ERPM < 200 RPM
#1 COIL
#2 COIL
POSITION COUNTER 90 (30° ADVANCE)
28
27
26
COP 30° ADVANCE (OR SI)
SI
SI
POSITION COUNTER 90 (30° ADVANCE)
PRELOAD
30°
PRELOAD
30°
27
26
COP 30° ADVANCE (OR SI)
SI
SI
DWELL COUNTER 98 AT 3000 RPM 98 COUNT OUT
SI
18°
18°
COD
BK#1
BK#2
COIL CURRENT
DEP
DEP CENTER
CE IRQ 78° BTDC
μ-COMPUTER, COMPUTE

IGNITION CONTROL SYSTEM FOR INTERNAL COMBUSTION ENGINES WITH SIMPLIFIED CRANKSHAFT SENSING AND IMPROVED COIL CHARGING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to the field of internal combustion engine control systems and, in particular, to those systems that avoid the use of distributors and achieve efficient coil charging, even at higher engine speeds.

2. Description of the Prior Art

It is well-known that rotational forces are derived from internal combustion engines by the igniting of air/fuel (A/F) mixtures injected into cylinders of such engines, to impart rectilinear movement to pistons disposed within the cylinders, whereby rotational forces are imparted to a crankshaft. A spark plug is disposed within each cylinder and is electrically energized to create a spark igniting the A/F mixture. The spark is timed with respect to a top dead center (TDC) position of the crankshaft to cause burning of the A/F mixture to impart forces on the cylinder and, therefore, on the crankshaft at a point in time after the cylinder has reached its TDC position. The angular position of the rotatively driven crankshaft is typically measured with respect to the TDC position of the cylinder. In particular, the spark is generated at a point in time, i.e., spark instant (SI), corresponding to a selected angular position of the engine's crankshaft. Typically, the spark is generated at a position before the TDC position to ensure that the A/F mixture will be ignited and that the A/F mixture burning will produce maximum pressure within the cylinder at a point in time after the piston reaches its TDC position. The angular position of the crankshaft at SI is commonly known as the spark advance angle $\theta a$ and is measured in reference to the TDC position. Because the spark advance angle $\theta a$ directly effects when the burning of the A/F mixture takes place, the spark advance angle $\theta a$ also effects the amount of torque that will be delivered to the crankshaft. The relationship between the spark advance angle $\theta a$ and the crankshaft torque is a first order function and must be controlled precisely to obtain maximum fuel economy and to minimize the pollutants emitted by the engine.

The prior art has typically employed a switch or, more accurately, an array of mechanical switches rotatively coupled to the engine crankshaft and responsive to crankshaft rotation to close, thus, completing an electrical circuit to apply electrical energy selectively to the spark plugs. Such an array of switches is commonly known as a distributor. In early automobiles, the distributors were coupled to a hand operated lever mounted upon the steering column to manually advance or retard the spark instant. Mechanical governor-type distributors represented an improvement over the manually advanced controls, employing a centrifugal device coupled to the distributor to advance the spark instant automatically as a function of the crankshaft speed. Later, a manifold vacuum gauge was coupled to the internal combustion engine to sense the manifold vacuum and, thus, the load applied to the engine. Typically, such manifold vacuum devices were coupled to a mechanical diaphragm which served to retard the spark instant as the engine load increased and, thus, the manifold vacuum decreased.

Distributors of the prior art typically included a cam that is rotatively coupled by a reduction gear to the internal combustion engine and disposed to contact successively the contacts or points of the distributor, whereby the circuit to a corresponding spark plug is completed. Typically in the prior art, the physical position of the points and, thus, the spark advance angle $\theta a$ could be adjusted by the governor to vary the spark advance angle $\theta a$ as a function of crankshaft speed. Further, the prior art suggests that the manifold vacuum be sensed to position the points to retard the spark as a function of engine load.

Because mechanical distributors are limited as to angle $\theta a$, the accuracy and the degree to which they may be controlled, electronic controls and, in particular, closed loop ignition systems have been employed to increase fuel efficiency and to decrease pollution emission. It is evident that the goals of decreasing pollution and increasing fuel efficiency are mutually exclusive in that as steps are taken to increase fuel efficiency, it becomes increasingly difficult to maintain the levels of pollution emission. Typically, emission control systems retard the spark advance angle $\theta a$, thus, limiting pollution emission, but at the expense of good engine performance. In particular, the spark advance angle $\theta a$ is advanced as a nonlinear slope function of engine speed. The mechanical devices of the prior art, as well as many of the electronic controls, are able to implement such a function of spark advance angle $\theta a$ versus engine speed linearly, but with relatively poor accuracy and limited adjustment. As a result, engines with such controls cannot be accurately timed to meet the new, rigid standards imposed by the U.S. Government.

As described above, ignition control is effected by setting the ignition instant in terms of the spark advance angle $\theta a$ with respect to TDC. Typically of many systems is that disclosed in U.S. Pat. No. 4,015,566 of Walh, which includes an electronic ignition system for a four cycle internal combustion engine that controls the timing of the ignition instants with respect to the measured crankshaft position as a function of engine speed. In particular, the Walh system employs a transducer for providing a first train of pulses indicative of cam shaft position and a second train of pulses indicative of crankshaft speed. The first train of pulses is generated by a crankshaft position transducer coupled to the distributor shaft which is geared down by a ratio of 2 to 1 with respect to its crankshaft. For the four cylinder engine of Walh, the crankshaft position transducer outputs four pulses of the first train for each revolution of the distributor shaft and two pulses for each revolution of the engine crankshaft. In a typical four cylinder auto engine, there are four cycles, or cylinder firings, for each revolution of the distributor shaft and each set of two revolutions of the engine crankshaft. Thus, during the first revolution of the engine crankshaft, the ignition control will consecutively fire cylinders 1 and 3 and, during the second revolution of the engine crankshaft, the ignition control will fire successively cylinders 2 and 4 of the Walh engine.

The problem in achieving low pollution emission and efficient engine performance resides in the fact that prior art ignition control systems do not accurately measure and provide a high resolution signal indicative of the position of the engine crankshaft. For example, the Walh crankshaft position transducer generates only two output pulses for each revolution of its crankshaft. Thus, if the Walh engine accelerates rapidly, not only its output signal indicative of crankshaft speed, but also its signal indicative of crankshaft position are in error. To overcome these problems. Applicant discloses in his U.S. Pat. No. 4,494,509 entitled "HIGH RESOLUTION ELECTRONIC IGNITION CONTROL SYSTEM", a new and improved electronic ignition control which advances and retards SI with significantly improved accuracy or resolution with respect to the crankshaft position. Applicant hereby incorporates by reference the disclosure of his above identified patent into this application. In particular, Applicant's patent describes an optical encoder connected to the crankshaft of a distributor and comprising first and second encoder discs. The first encoder disc has a relatively large number of transmissive portions to generate a first, relatively high frequency signal, the frequency of which is an accurate indication of the angular rotational velocity of the engine crankshaft. The first train of pulses is applied to a phase locked loop which filters and outputs a signal of increased frequency proportional to that of the first train. The second encoder disc has a relatively few portions to generate a second train of signals of a second, lesser frequency. Each signal of the second train occurs in time when the crankshaft rotates past a fixed reference point in the rotation of the engine crankshaft. The reference point is set illustratively at 45° before top dead center (BTDC). SI is accurately controlled to occur at the end of a variable length arc of crankshaft rotation starting at the 45° BTDC reference point. The variable length of this arc is set dependent upon a selected engine parameter, e.g., the angular or rotational velocity of the engine crankshaft. The first high frequency train of signals is counted or integrated over a fixed period to obtain an accurate indication of crankshaft velocity. This accurate indication of crankshaft velocity is used to address one of a plurality of counts stored in memory. The counts are indicative of the degree or angle of advance or retard for that particular engine as a function of crankshaft velocity. A high resolution signal indicative of the crankshaft position is obtained by applying the high frequency signal of the phase locked loop to a crankshaft position counter, which initiates counting of the high frequency signal upon the occurrence of each signal of the second train. The crankshaft position counter counts to a point corresponding to the desired crankshaft arc as determined by the addressed count to provide an output signal, the occurrence of which controls SI. The SI is determined, not based upon a sensor which provides an output signal once or twice per revolution of the crankshaft, but rather upon the high frequency train of signals, thus, effecting ignition timing with a corresponding high degree of accuracy.

It is evident that fuel efficiency, pollution prevention and engine performance can be enhanced by improving the accuracy with which SI is set. In the ignition controlled system, as described in the above referenced U.S. Patent, a reduction gear mechanism included within the distributor couples the engine crankshaft to the first and second encoder discs, as described. Such a reduction gearing mechanism is a source of "backlash" which produces errors in the definition of the engine crankshaft position. In the ignition control systems of the prior art, the timing signals were of such low resolution that the inclusion of a reduction gearing, as typically employed between the engine crankshaft and the distributor, did not appreciably effect the timing of SI or the engine performance. However, as the accuracy of providing SI improves, the inaccuracies introduced by such reduction gearing are no longer acceptable.

To overcome the problems associated with the use of reduction gearing, Applicant discloses in his U.S. patent application Ser. No. 764,970, entitled "A PRECISION DISTRIBUTORLESS IGNITION CONTROL SYSTEM FOR INTERNAL COMBUSTION ENGINES", filed on Aug. 12, 1985, now U.S. Pat. No. 4,649,881, an electronic ignition system including a rotor directly coupled to the engine's crankshaft and comprising at least one first reference indicium and a plurality of N second reference indicia thereon for each first reference indicia. First and second signal generators are disposed at a point fixed in relation to the rotation of the crankshaft for providing first and second trains of signals in response respectively to the passage of each of the first and second reference indicia. SI is controlled by an arc termination circuit in the form of a counter, which is initiated in response to each first signal for measuring a variable crankshaft arc terminating at SI. The second train of signals is applied to a phase locked loop, which multiplies and outputs a signal of a relatively high frequency, which is applied to the aforementioned arc termination counter. In an illustrative embodiment described in this application, the rotor takes the form of a cylinder directly rotated by the motor's crankshaft and having a first plurality of slots therein corresponding to the first reference indicia and a second set of slots therein corresponding to the N second reference indicia. The first indicia are disposed on the rotor in a fixed relationship with the engine's crankshaft and, therefore, in a fixed relationship with TDC of the engine's cylinder. However, two signal generators are required to sense the first and second indicia, as well as circuitry for decoding and controlling which cylinder is to be fired next. The use of two or more signal generators adds to the cost of such ignition systems, as well as increases the difficulty of synchronizing the high resolution crankshaft signals as derived from the second signal generator.

It would be desirable to employ but a single signal generator that would not only supply a train of high resolution signals or pulses, but also a signal indicative of when the crankshaft rotates past a cylinder reference point such as TDC. The problem of using a single signal generator lies in the ambiguity presented by a single train of high resolution signals particularly when that ignition system must accurately control SI over an extremely wide speed range of the crankshaft varying from low engine speeds below 30 ERPM observed during engine cranking, to high speeds of over 12,000 ERPM required for racing engines. This is a speed range of 400:1. In addition, the rotation of the crankshaft is not constant; it may stop and then immediately start again. Further, rapid acceleration and deceleration is often imposed on the engine's crankshaft.

Further, an electronic ignition system must not only control SI, but also effect ignitions within a predetermined sequence of the cylinders. If a cylinder is fired out of turn, combustion could take place within a cylinder with its intake valve open, thus possibly causing an engine fire. Thus, it is desired to provide a high resolution signal that is capable of giving very accurate indication of crankshaft position, while ensuring that reference data indicative of the relative position of the crankshaft to the engine cylinders is provided so that synchronization is achieved within one resolution of the crankshaft over a very large speed range.

The above-identified patent of applicant further describes a circuit for charging the ignition coils with sufficient current, regardless of crankshaft speed. Charging the ignition coils with sufficient current is vital to produce the required spark energy for the engine's spark plugs. If the coil charging time is too long, power is wasted and the switching devices employed to selectively apply current to the coils, over-heated. In turn, switches, e.g., power transistors, of increased rating and cost must be employed in such systems.

On the other hand, if the coil charging time is to short, the ignition coil will not be sufficiently charged and the coil energy applied to the spark plugs may be insufficient to fire the A/F mixture. It is further realized that battery condition and engine speed may unduly effect the coil charging time. If timing is derived from a sensor connected to the engine's crankshaft and coil cut on time is derived as a function of the crankshaft position, the coil charging time will decrease as engine speed increases. This effect is particularly true for six and eight cylinder engines, because of the increased number of ignitions per crankshaft revolution required for such engine configurations. Further, as a battery grows older, its current output decreases, which may effect the current charging applied to the ignition coil.

SUMMARY OF THE INVENTION

It is, therefore, an object of this invention to provide a new and improved "distributorless" engine control system employing a simplified sensor for measuring crankshaft position and velocity.

It is a further object of this invention to provide a simplified crankshaft position sensing mechanism including but a single sensor for sensing the rotation of a rotor, which is directly connected to the crankshaft.

It is a still further object of this invention to provide a new and improved ignition control system which insures sufficient charging time of the ignition coils, regardless of engine speed or battery condition.

In accordance with these and other objects of the invention, there is disclosed an electronic ignition system for controlling as a function of at least one selected engine parameter the ignition or spark instants of an internal combustion engine having at least one cylinder with a piston and a rotatable crankshaft coupled to the piston to be rotatably driven as combustions occur within the cylinder at spark instant. The crankshaft has at least one reference position defining a positional relationship of the crankshaft to the cylinder. The electronic ignition system comprises a rotor fixed to rotate with the crankshaft and having a plurality of reference indicia thereon positionally related with respect to the reference position. The reference indicia are disposed at points equally spaced from each other by a predetermined arc of crankshaft rotation about the rotor. At least one of the points has a missing indicium and is disposed in a predetermined relation to the reference position of the crankshaft. A single sensor is disposed at a point fixed in relation to the rotation of the crankshaft for providing a train of signals, each signal occurring in time when each of the plurality of reference indicia rotates past the fixed point. The missing indicium is determined by circuitry responsive to each sensor signal for measuring the arc of crankshaft rotation from the current, corresponding reference indicium and, if the measured arc is greater than the predetermined arc, for providing a missing indicium signal.

This missing pulse circuit applies the missing indicium signal to initiate a synchronization counter to count the train of signals, to accumulate a count or manifestation indicative of crankshaft position. The crankshaft manifestation is decoded to provide a signal indicative of the one reference position of the crankshaft. A crankshaft position circuit or counter is initiated to measure a variable crankshaft arc and when the measured crankshaft arc equals the variable crankshaft arc set as a function of a selected engine parameter, an ignition signal is generated to control the spark instant.

In a further aspect of this invention, the electronic ignition system includes a switch for applying a voltage source to the ignition coil to initiate a dwell period and for disconnecting the voltage source at spark instant to terminate the dwell period and initiate the timing of an anti-dwell period. A circuit is provided for measuring the current charging an ignition coil for firing a spark plug to cause combustion within the cylinder, and for measuring that arc of crankshaft rotation required for the voltage source to charge the ignition coil to a reference level. A further circuit or counter times the anti-dwell period and, thus, the actuation of the switch to disconnect the voltage source from the ignition coil to initiate the anti-dwell period and for actuating the switch to apply the voltage source to the ignition coil after a variable arc of crankshaft rotation set in accordance with the measured arc to ensure that the ignition coil is fully charged and the spark plug is energized at a sufficiently high level regardless of the crankshaft speed and the voltage source condition. In an illustrative embodiment of this invention, the circuit for deactuating and actuating the switch takes the form of a counter for counting a signal proportional to crankshaft velocity until the accumulated count corresponds to the measured arc.

BRIEF DESCRIPTION OF DRAWINGS

A detailed description of the preferred embodiment of this invention is hereafter made with specific reference being made to the drawings in which.

PREFERRED EMBODIMENT OF THE INVENTION

Figure 1:
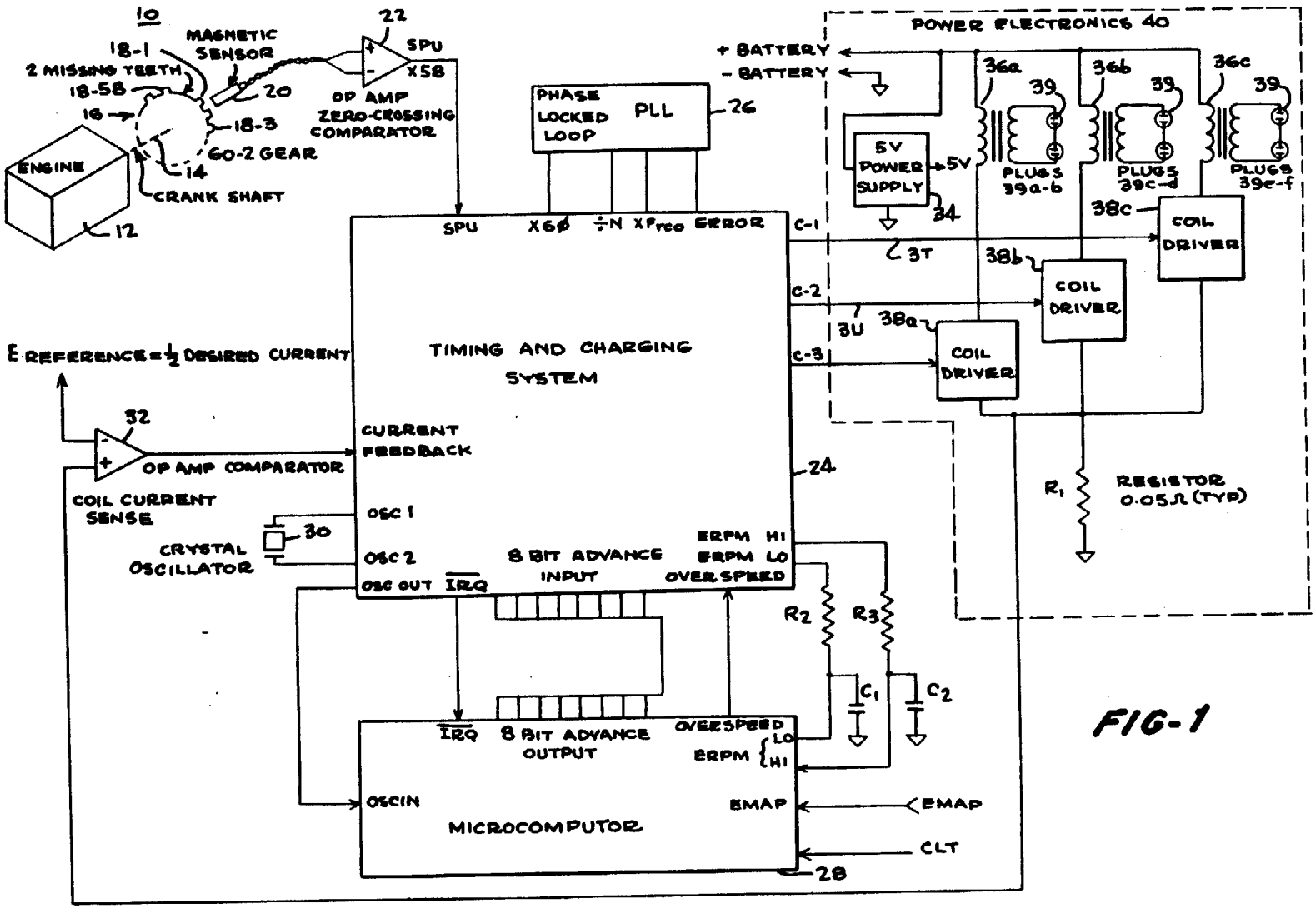
FIG. 1 is a functional block diagram showing the manner in which a single sensor is directly coupled to an internal combustion engine for generating signals to be processed in accordance with an ignition control system of this invention, whereby the timing of the coil charging time and spark or ignition instant (SI) is accurately controlled.

Referring now to the drawings and in particular to FIG. 1, there is shown an ignition control system identified by the general number 10, which includes a rotor 16 illustratively comprising a gear directly connected to a crankshaft 14 of an internal combustion engine 12. The rotor 16 includes some 58 tooth like protrusions 18-1 to 18-58, each protrusions being spaced 6" from each other to leave a space between protrusions 18-58 and 18-1 for two missing teeth or protrusions. Protrusions 18-1 is affixed to the crankshaft 14 so that it is oriented 60" before top dead center (BTDC) of a cylinder of the engine 12.

Figures 3A, 3B, 3C, 3D, 3E, 3F, 3G, 3H, 3I:
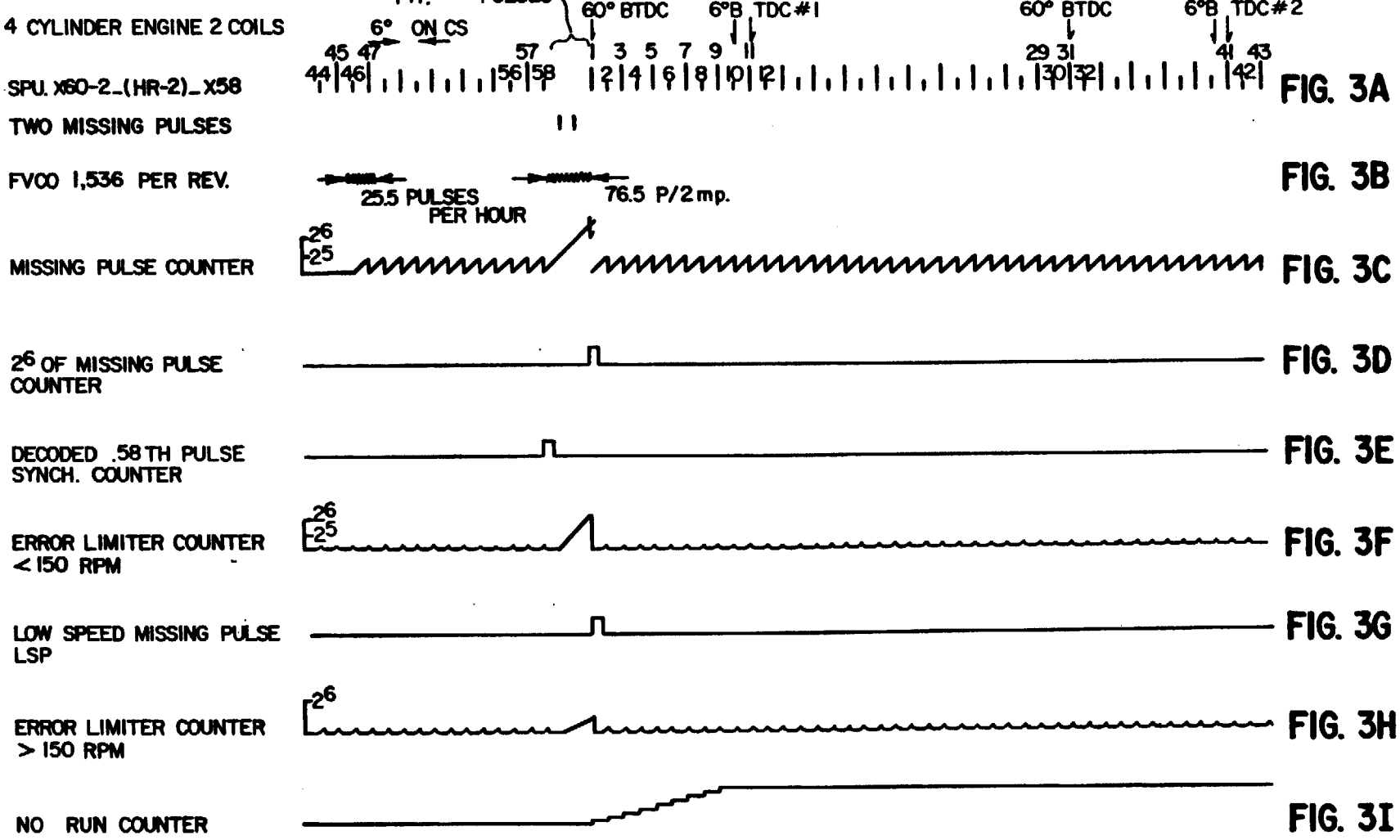
FIGS. 3A to 3Z show respectively the wave forms of various signals as generated within the ignition control system as shown in FIGS. 1, 2A and 2B.

A sensor 20, illustratively in the form of a magnetic sensor, is mounted stationary with respect to the engine 12 and the rotating rotor 16. The sensor 20 responds to the passage of a protrusion 18 by generating a pulse, which is applied to a zero-crossing comparator 22 in the form of an operational amplifier. The passage of a protrusion 18 drives the output of the sensor 20 to output a positive going speed pick-up (SPU) signed. The placement of the two missing protrusions identifies a reference position of the crankshaft 14 with respect to the cylinder of the engine 12. The SPU signal is illustrated in FIG. 3A and is the only signal applied to a timing and charging system 24, which operates to determine the occurrence of the two missing SPU signals, corresponding to the absence of the two protrusions, to provide a timing or reference signal indicative of 60° BTDC of a cylinder of the engine 12, whereby an indication of the position of the rotating crankshaft 14 may be accurately provided.

A phase locked loop 26 is coupled to the timing and charging system 24 and generally functions to multiply the frequency of the SPU signals by a selected, constant value, e.g., 25.5, so that its output frequency Fvco is 25.5 times the frequency of the SPU signal. The function and circuitry of the phase locked loop 26 will be explained in detail later. The timing and charging system 24 applies timing signals C1, C2 and C3 to power electronics 40, whereby energy as supplied by a voltage source in the form of a battery is selectively applied to charge one of a plurality of ignition coils 36a, 36b and 36c. In particular, the output signals C1, C2 and C3 drive or actuate one of a plurality of coils drivers 38a, 38b and 38c, whereby the voltage source is applied to and disconnected from the selected one of the ignition coils of 36a, 36b and 36c. When its coil driver 38 is turned off, a corresponding high voltage appears at the secondary of that coil 36 which is applied at SI to fire a corresponding pair of spark plugs 39. The power electronics 40, as illustrated in FIG. 1, serves to produce the spark at the SI of a six cylinder engine 12, with each of the three ignition coils 36 being associated with a pair of spark plugs 39.

Further, a resistor R1 is disposed in circuit with each of the coil drivers 38a, 38b and 38c, whereby the voltage applied across resistor R1 is proportional to the current charging the ignition coil 36. The voltage appearing across resistor R1 is compared with a reference voltage illustratively set equal to one-half the desired charging current, as will be explained. When the coil charging current equals the reference current, the comparator 32 applies a signal to the timing and charging system 24. A crystal oscillator 30 is coupled to the timing and charging system 24 to provide a high frequency clock, whereby the timing operations of the ignition control system 10 are carried out.

A microcomputer 28 computes the optimal spark advance angle $\theta a$ as a function of at least one selected engine parameter, e.g., engine speed ERPM, and engine pressure (or vacuum) MAP, as is well known in the art. The spark advance angle $\theta a$ is illustratively output as an 8 bit binary number to the timing and charging system 24. These 8 bit binary numbers are stored in a ROM of the microcomputer 28 and are empirically determined by applying controlled loads to the engine 12 and determining the spark advance angle $\theta a$, which will deliver an optimum mean torque output to its crankshaft 14 for a particular rotational speed. The timing and charging system 24 provides filtered voltages proportional to the rotational speed ERPM of the crankshaft 14 in two scales ERPM Hi and ERPM Lo. These two speed signals are scaled for rotational speeds of 0 to 8000 ERPM and 0 to 4000 ERPM, respectively. These speed voltages are filtered by a corresponding pair of low pass filters as comprised respectively of resistor R2 and capacitor C1, and resistor R3 and capacitor C2 to provide smooth voltages which are proportional to the respective speeds and are directed to the microcomputer 28. The ROM of the microcomputer 28 stores a three dimensional spark advance map, corresponding to the parameters of engine speed, engine pressure and coolant temperature junction CLT. In order to limit the size of the ROM, the micro computer 28 employs an interpolation routine to process the data read out from the ROM for specific values of engine speed, engine pressure and coolant temperature junction.

The timing and charging system 24 applies an $\overline{IRQ}$ signal to the microcomputer 28 to initiate calculation of the desired spark advance angle $\theta a$ in view of the current values of engine speed, engine pressure and coolant temperature junction. Illustratively, the $\overline{IRQ}$ signal is applied to the microcomputer 28 at 78° BTDC so that the microcomputer 28 has sufficient time to compute the 8 bit spark advance angle $\theta a$, before the timing of SI is carried out by the timing and charging system 24. The timing and charging system 24 responds to the reference signal to initiate at the reference position, e.g., 60° BTDC, by timing a variable arc of rotation of the crankshaft 14 in accordance with the calculated spark advance angle $\theta a$. At the end of the variable crankshaft arc, the system 24 deactivates the driven coil driver 38 to effect spark plug firing at the SI. In a particular embodiment, the timing and charging system 24, operates over a particular arc of interest for timing SI, e.g. 60° to 0° BTDC.

It is important to take values of the engine speed ERPM and engine pressure EMAP immediately before they are to be used in the computations of the microcomputer 28, since such data rapidly changes and significant errors may be introduced in determining the spark advance angle $\theta a$, if such engine parameters are old. To prevent such errors, system 24 applies the $\overline{IRQ}$ signal to an interrupt of the microcomputer 28 to initiate the reading of its ROM and the subsequent interpolation of the read spark advance data. The coil drivers 38 are actuated by applying a digital coil-on signal, whereby a voltage source is applied to the respective ignition coils 36, which permits them to be charged with the voltage source. A power supply 34 is also connected to the battery voltage whereby a regular five volt signal is applied to the various elements of the ignition control system 10.

Figure 2A:
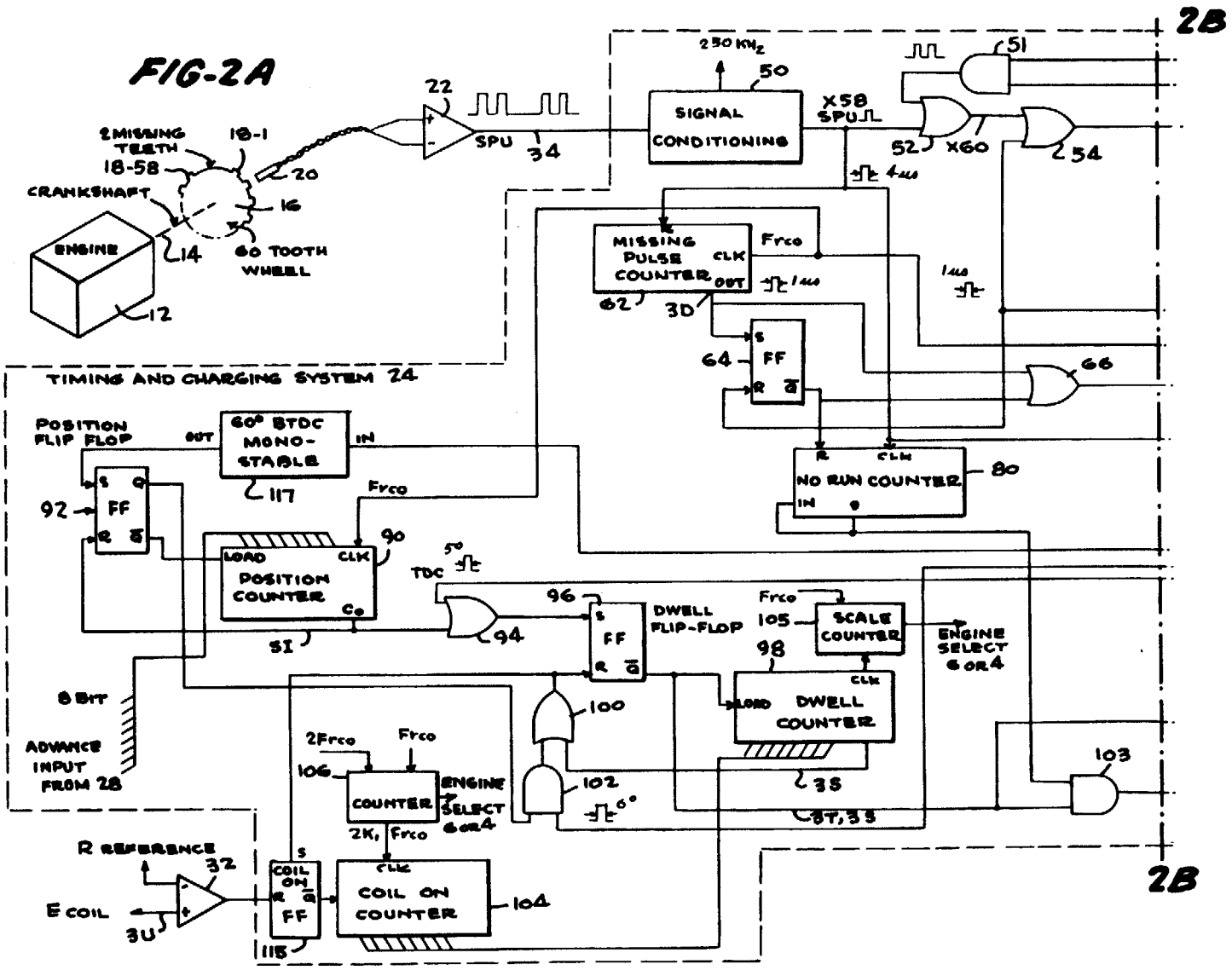
FIGS. 2A and 2B are functional block diagrams illustrating the components of the ignition control system as generally shown in FIG. 1.
Figure 2B:
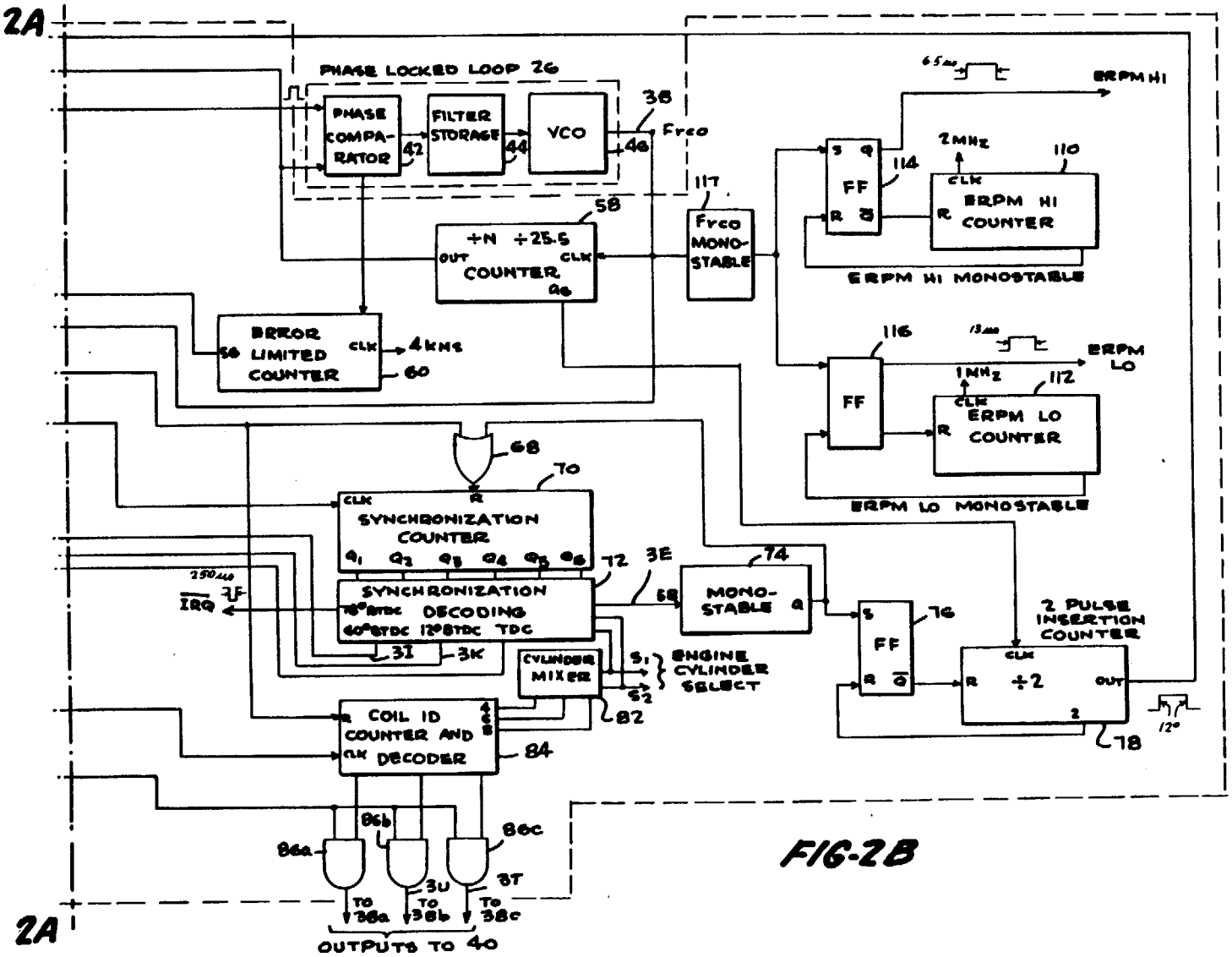

Referring now to FIGS. 2A and 2B, the timing and charging system 24 generally shown in the FIG. 1, is more fully shown in FIGS. 2A and 2B. In FIGS. 2A and 2B, the signals appearing at various portions of the circuitry of the timing and charging system 24 are indicated by corresponding designations of the wave forms shown in FIGS. 3A-3Z. For example, the output of the zero-crossing comparator 22 is identified by 3A, indicating that the wave form of those SPU signals is shown in FIG. 3A. The SPU signals as developed by the zero-crossing comparator 22 are applied to the timing and charging system 24 and, in particular, to its signal conditioning circuit 50. It is understood that electrical noise is a severe problem in the environment of an automotive engine. For example, the ignition control system 10 and, in particular the power electronics 40 can produce a 45,000 volt spark. Typically, the signals as developed within the timing and charging system 24 and the microcomputer 28 are in the order of five volts. If such high voltage, electrical noise were introduced into the timing and charging system 24 or the microcomputer 28, not only would the signal processing be interrupted, but potentially the circuitry would be damaged. To avoid these problems, the signal condition circuit 50 measures the width of the inputted signals and, if less then the normal pulse width of a SPU signal e.g., 20 microsecond, such signals are not applied to the remaining circuit elements of the timing and charging system 24. If the pulse width of the inputted signal is longer, it is assumed that these signals are SPU signals, which are inputted to the timing and charging system 24.

The SPU signals are illustrated in FIG. 3A as being equally spaced from each other by 6°. If two protrusions were not missing from the rotor 16, 60 equally spaced SPU signals would be produced. However, the removal of the two protrusions deletes two signals from the train of SPU signals, the two missing signals occurring between the 58th and 1st SPU signals. The two missing protrusions are set respectively at 72° and 66° BTDC, so that the first protrusion 18-1 thereafter rotates past the sensor 20 at a point fixed relative to the crankshaft 14 at 60° BTDC. As will be explained, the timing and charging system 24 detects the two missing protrusions to synchronize its operation and, in particular, to initiate the timing of the spark advance angle $\theta a$ at 60° BTDC and the sequencing of the energizing of the ignition coils 36a, 36b, and 36c so that cylinder combustions occur in a desired sequence.

First, the train of SPU signals, as shown in FIG. 3A, is applied via OR gates 52 and 54 to the phase locked loop 26, comprising a phase comparator 42, a filter storage 44 and a voltage controlled oscillator (VCO) 46. The phase locked loop 26 and, in particular, the VCO 46 multiplies the SPU signals by a constant, e.g., 25.5 to output the signal Fvco at a frequency selected to have 255 pulses per 60° of crankshaft rotation or 1,530 signals per revolution of the crankshaft 14. As will be seen later, the selection of the constant 25.5 permits the use of standard 8 bit counters for performing the timing operations of the timing and charging system 24. The Fvco signal is applied to the clk input of a device-by-N counter 58, where N is selected equal to the constant 25.5. The output of the divide-by-N counter 58 is applied to a second input of the phase comparator 42, which outputs an error signal equal to the phase difference between the leading edge of each counter input and SPU signal. This error signal is filtered by the filter storage circuit 44 to further minimize the noise that is introduced into the timing and charging system 44. The filtered output is in turn applied to the VCO 46, which varies the frequency of its output signal Fvco proportionally to the inputted filtered signal. The phase locked loop 26 acts as an electronic servo, whose speed change limits can be programmed to allow the engine dynamic characteristics to be imitated. Such control allows continuous simulation of engine speed from the high resolution crankshaft data, while imposing optimum dynamic limitations to protect against noise and to provide realistic dynamic characteristics to the output signal.

The train of SPU signals, as shown in FIG. 3A, is applied to the reset of a missing pulse counter 62, which detects output signals when the two missing protrusions of the rotor 16 rotate past the sensor 20, to provide an output signal which is used for synchronization purposes, as will be described. Since the pulse width of each of the SPU signals varies with engine speed, the signal conditioning circuit 50 includes a monostable circuit to sense each SPU signal to provide a pulse of a width of 4 microseconds. Such pulses are applied to the reset of the missing pulse counter 62 to initiate the counting of the Fvco signal outputted by the phase locked loop 26. As the protrusions 18 rotate past the sensor 20, each SPU signal (or its corresponding monostable output) will reset the missing pulse counter 62. The protrusions 18 are disposed 6° apart so that the phase lock loop 26 generates 25.5 counts of the signal Fvco. Upon occurrence of the two missing protrusions, the missing pulse counter 62 will count more than 25.5 pulses of the Fvco signal, causing the missing pulse counter 62 to overrun, as shown in FIG. 3C, and to output a missing protrusion or indicium signal, as shown in FIG. 3D. FIG. 3D is an indication of the magnitude of the digital output of the missing pulse counter 62, which rises when two missing protrusions occur. In actual practice, the missing pulse counter 62 is set to count 48 pulses of the Fvco signal before outputting its synchronizing pulse.

Figures 3J, 3K, 3L, 3M, 3N, 3O, 3P, 3Q, 3R:
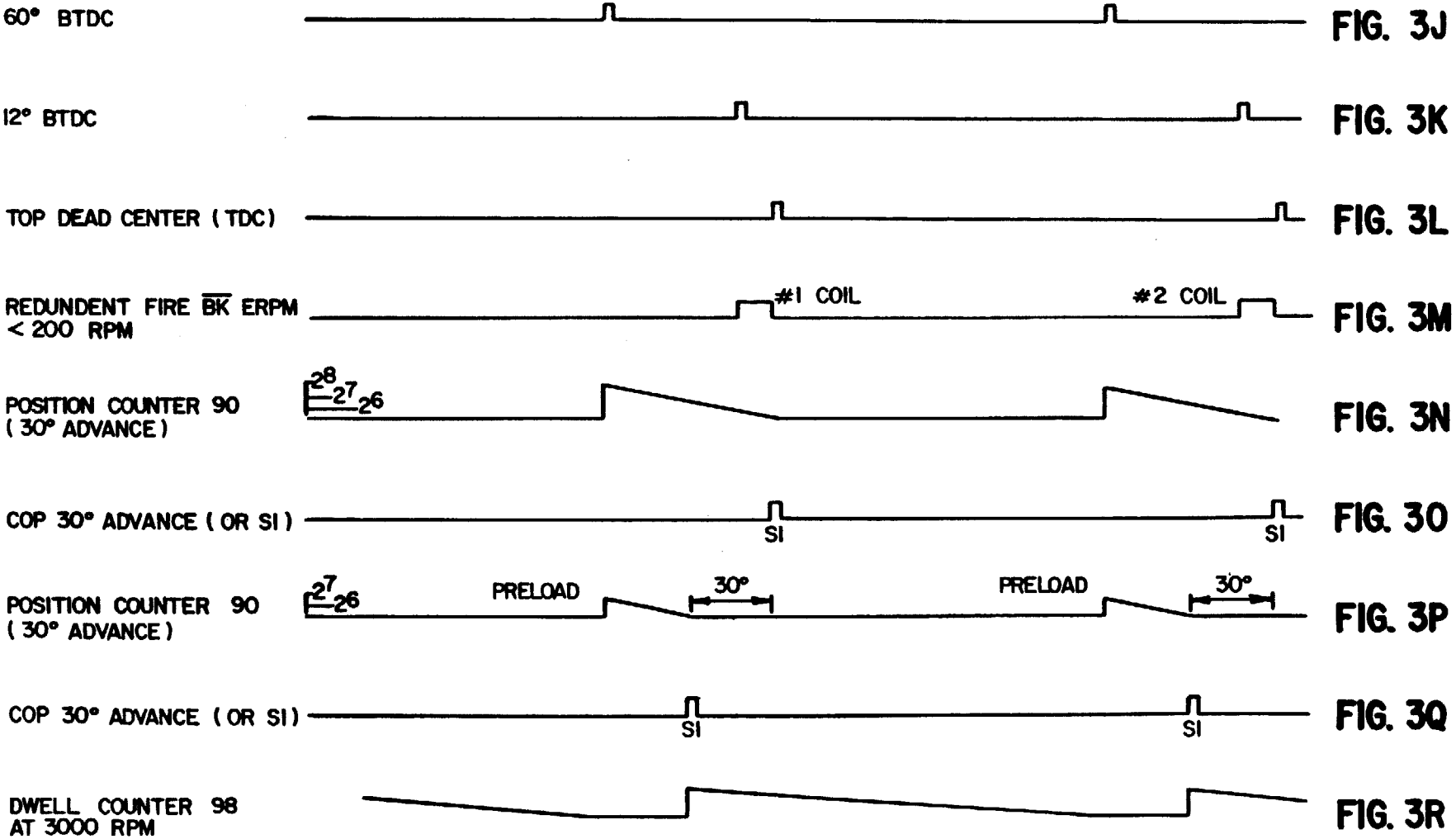
Figures 3S, 3T, 3U, 3V, 3W, 3X, 3Y, 3Z:
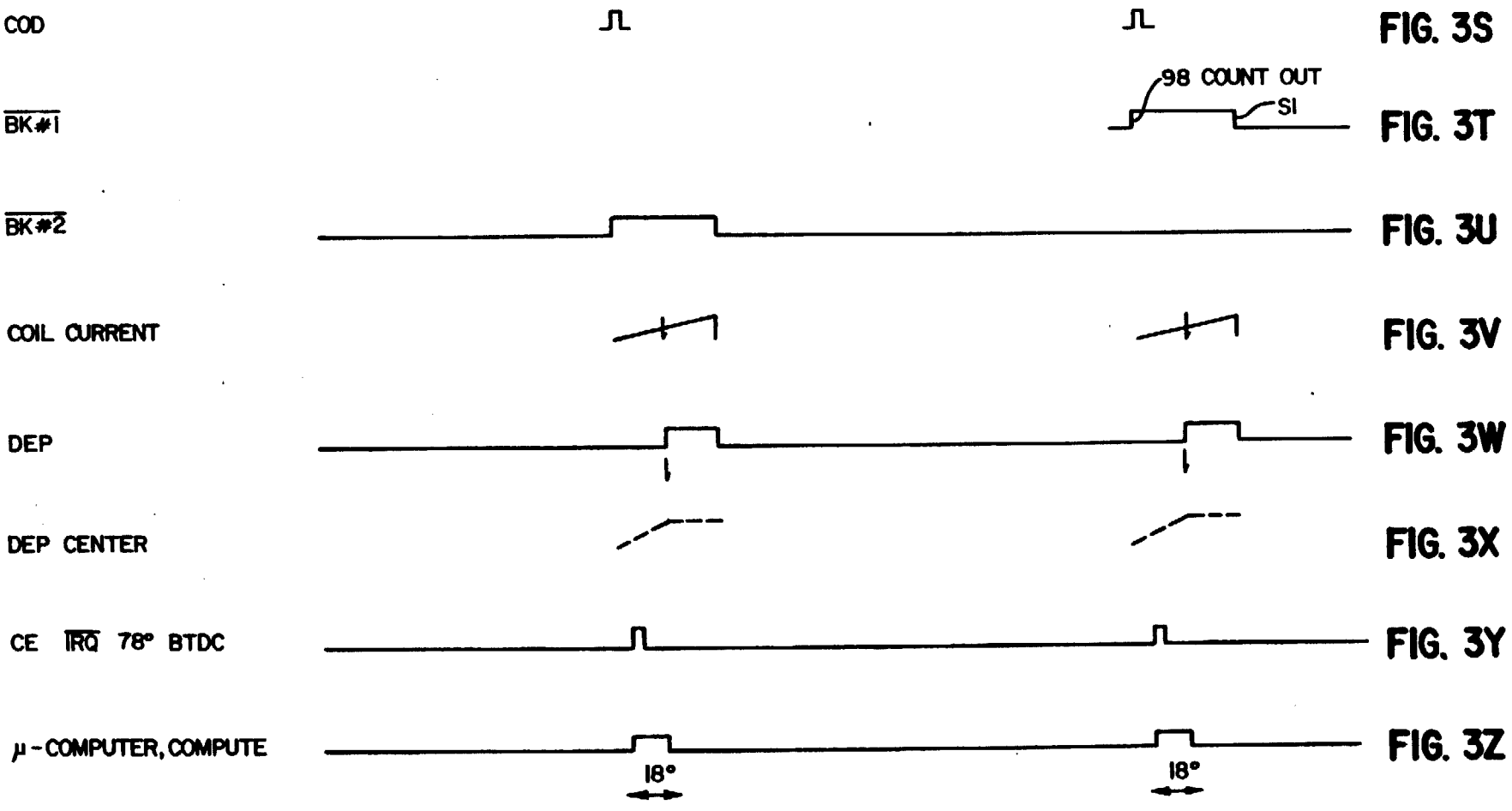

When the missing pulse counter 62 overruns or goes high as seen in FIG. 3D, its missing indicium signal is applied via OR gates 66 and 68 to reset a synchronization counter 70. The synchronization counter 70 counts the SPU signals to provide at its Q1 to Q6 outputs a digital signal indicative of the position of the crankshaft 14 in 6° steps. The output of the missing pulse counter 62 resets the synchronization counter 70 to zero. The Q1 to Q6 outputs of the synchronization counter 70 are coupled to a synchronization decoding circuit 72, which decodes the binary output of the synchronization counter to provide output signals indicative of the instantaneous, angular position of the crankshaft and, in particular, of a reference position of the crankshaft 14 with respect to at least one selected cylinder, e.g., 60° BTDC. The synchronization decoding circuit 72 outputs a reference signal, e.g. a 60° BTDC position signal, indicative of the selected reference position, only after the synchronization counter 70 has been reset by the missing indicium signal and has counted at least the first SPU signal, corresponding to the rotation of the first protrusion 18-1 past the sensor 20. Such logic removes any ambiguity in the timing of the reference signal, noting that the missing indicium signal occurs at a point in time estimated as to where that signal should occur. The synchronization decoding circuit 72 outputs: (1) a 78° BTDC signal, as shown in FIG. 3Y, which is applied to the IRQ input of the microcomputer 28 to initiate calculating of the spark advance angles $\theta a$, as explained above; (2) a 60° BTDC position signal, as shown in FIG. 3J, which initiates the timing of the SI over the arc of 60° BTDC and TDC position of the crankshaft 14; (3) 12° BTDC and TDC position signals, as shown in FIGS. 3K and 3L, respectively; and (4) an output indicative of the counting of the 58th SPU signal, as shown in FIG. 3E, which is applied to a monostable 74, which in turn applies a 1 microsecond pulse through the NOR gate 68 to reset the synchronization counter 70. The 12° BTDC and TDC position signals are used, as will be explained, for redundant fire or firing of the ignition coils 36 at very low speed, e.g., crankshafts speeds below 300 ERPM.

As shown in FIG. 2B, engine cylinder select signals S1 and S2 are applied to the synchronization decoding circuit 72 to define the number of cylinders and, in particular, the number of ignition events per revolution of the crankshaft 14. As seen in FIG. 3A for a four cylinder engine, two cylinder events occur per crankshaft revolution, thus requiring two crankshaft revolutions to fire all four cylinders. The rotor 16 has two missing teeth occurring at points 59 and 60, which are detected as described above to reset the synchronization counter at a reference point, e.g., 60° BTDC, and to provide a sequence of signals at its outputs Q1 to Q6 indicative of the instantaneous position of the crankshaft 14 with respect to the fixed position of the sensor 20. In such an arrangement, only one missing pulse signal will be outputted from the missing pulse counter 62 per revolution of the crankshaft 16. Dependent upon the number of ignition events per crankshaft revolution as indicated by the engine select signals S1 and S2, the synchronization decoding circuit 72 outputs a corresponding number of sequences of signals including an arc initiation signal at 60° BTDC and the other signals as mentioned above. For example as shown in FIG. 3A where two ignition events occur per crankshaft revolution, a 60° BTDC or initiation signal is outputted corresponding to the first indicium 18-1 to initiate the timing of the variable arc terminating at the first ignition event; thereafter, during the same crankshaft revolution, a second 60° BTDC or initiate signal is generated at indicium 31 to initiate the timing of the second ignition event. It is understood that if three ignition events occur per crankshaft revolution, as for a six cylinder engine, then three sets of these signals would be outputted by the synchronization decoding circuit 72. For an eight cylinder engine 12, the operation of the first four cylinders is the same as that represented in FIG. 3A, and the signals for the second four cylinders are 90° displaced from the shown signals; illustratively, ignition control could be effected for an eight cylinder engine 12 by employing two timing and charging systems 24.

The number of points for defining the positions of the protrusions 18 is selected in accordance with the number of cylinders of the engine 12 and, in particular, the number of ignition events per revolution of the crankshaft 14. These rotor points, even points where the missing protrusions would have occurred, are equally spaced from each other by a predetermined arc of crankshaft rotation. The number of such points must satisfy certain logical relationships to permit a given number of cylinders and, in particular, a given number of ignition events per crankshaft revolution, to be fired. At minimum, the quotient of the number of points divided by the number of ignition events per crankshaft revolution, must be a whole number. In an illustrative embodiment of this invention, the rotor 16 is selected to have 60 such points, thus providing a minimum number of protrusions 18 that would supply SPU signals to control the ignition events of engines with 1, 2, 3, 4, 5, and 6 ignitions events per crankshaft revolution. As will be explained with respect to FIG. 4, a rotor 16 with 60 protrusions 18 permits the logical operations as carried out by the synchronization counter 70 and the synchronization decoding circuit 72 to control ignition timing for each of 4, 6 and 8 cylinder engines, but may also be adapted readily to control the ignition firings of 1, 2, 3, 5, 10 and 12 cylinder engines.

A coil ID counter 84 selects which of the ignition coils 36 is to be charged and then fired. The output of the missing pulse counter 62, corresponding to the occurrence of the missing two protrusions, is applied via the NOR gate 66 to reset the coil ID counter 84 once per revolution of the crankshaft 14 at a known or reference position corresponding to the first ignition coil 36 to be fired. The coil ID counter 84 is clocked or toggled by the SI signals and controls the coil drivers 38 as will be explained below. These coded outputs are derived from the coil ID counter 84 and are applied to AND gates 86a, 86b and 86c, which are in turn coupled to the coil drivers 38a, 38b, 38c, respectively, as shown in FIG. 1. Engine cylinder select signals S1 and S2 are applied to a cylinder multiplexer 82 dependent upon whether the engine 12 is a four, six or eight cylinder engine, whereby the operation of the synchronization decoding circuit 72 and the coil ID counter 84 may be adjusted accordingly. When a four cylinder engine 12 is selected by the cylinder multiplexer 82, only the second and third output signals are realized and applied to the AND gates 86c and 86b. If a six cylinder engine 12 is selected, all three outputs of the coil ID counter 84 and the three AND gates 86a, 86b and 86c are utilized.

Figure 4:
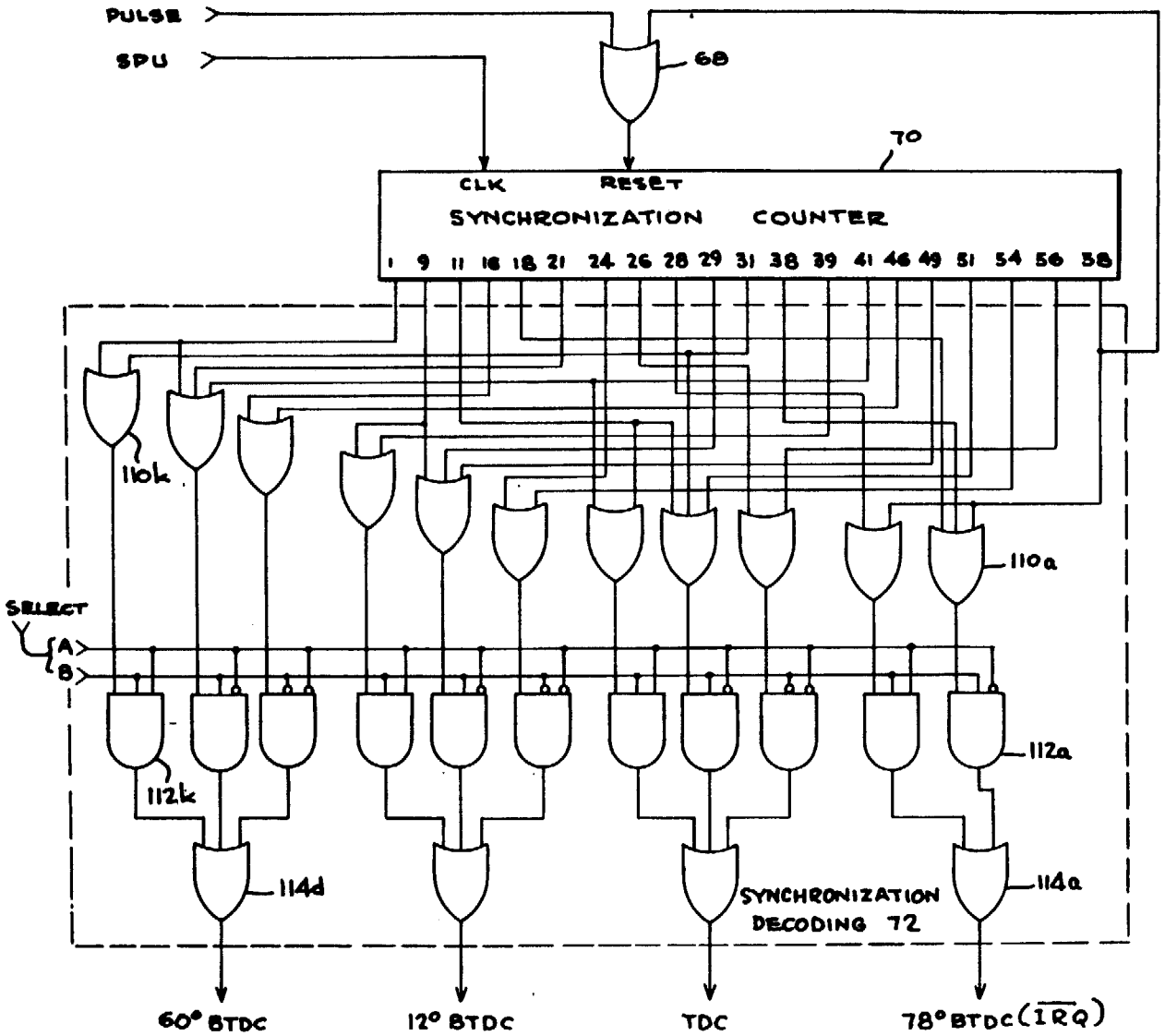
FIG. 4 is a detailed circuit diagram of the logic elements comprising the synchronization decoding circuit, as shown in FIG. 2B.

The synchronization decoding circuit 72 shown generally in FIG. 2B is more fully shown in FIG. 4 as comprised of a series of logic elements including a first array of OR gates 110A to 110K connected selectively as shown to the digital outputs of the synchronization counter 70. In turn, the OR gates 110 are connected to a set of AND gates 112A to 112K, which are selectively enabled in accordance to whether the electronic ignition system 10 is to be employed with a four, six or eight cylinder engine 12. The outputs of the AND gates 112 are in turn connected to OR gates 114A to 114D to respectively provide the 78° BTDC signal, the TDC signal, the 12° BTDC signal and the 60° BTDC signal. If a four cylinder engine is to be controlled, buses A and B as coupled to the inputs of the AND gates 112 are disposed high, whereby the aforementioned signals are generated as shown by the wave forms of FIGS. 3A-3Z. If a six cylinder engine is to be controlled, the bus A is maintained low, while bus B is disposed high whereby the outputs obtained from the synchronization decoding circuit 72 are timed to occur three times per revolution of the crankshaft 14. For an eight cylinder engine 12, the buses A and B are disposed low, whereby four initiating signals are outputted at 60° BTDC for each of four of the eight cylinders, during each revolution of the crankshaft 14.

Due to the use of a rotor 16 with missing protrusions, it is necessary to modify the normal operation of the phase locked loop 26. After the occurrence of the 58th SPU signal, there is no 59th and 60th SPU signals as would normally be generated from the sensor 20 to be applied to the phase comparator 42 of the phase locked loop 26. However, the signal stored by the filter storage 44 actuates the VCO 46 to continue to generate the output signal Fvco, whereby the divide-by-N counter 58 outputs pulses at 6° and 12° BTDC during the missing pulse interval, even though there are no 59th and 60th SPU signals. The phase comparator 42 tends in the absence of such 59th and 60th SPU signals to generate a large error signal tending to decelerate the engine 12. In one aspect of this invention, the timing and charging system 24 is responsive to the missing 59th and 60th SPU signals to generate these missing signals and to apply them to the phase locked loop 26, whereby the frequency of the signal Fvco is maintained and the timing operations carried out by the timing and charging system 24 are continued in an accurate fashion. As explained above, upon occurrence of the 58th SPU signal, the synchronization decoding circuit 72 actuates the monostable 74 to output a pulse, which is applied to a flip flop 76. In turn, the flip flop 76 resets a two pulse insertion counter 78. The modulo of the counter 78 is two, whereby the counter 78 functions to count two output pulses of the divide-by N counter 58 and to combine or "or" these two pulses to provide an output pulse of a width corresponding to the rotation of the crankshaft 14 through an arc of 12°. The output of the two pulse insertion counter 78 is applied to an AND gate 51, the other input being supplied by the divide-by-N counter 58, whereby two output pulses of the counter 58 are applied to the phase locked loop 26 in place of the 59th and 60th SPU signals. Since the phase locked loop 26 continues to generate its output Fvco at a frequency corresponding to the last inputs of the SPU signals, the placement of the pulses from the divide-by-N counter 58 is accurate.

The two pulse insertion counter 78 may be only used to control the insertion of missing pulses after the synchronization counter 70 has counted at least 58 SPU pulses and, thus, is not available to supply missing pulses during cranking or start-up of the engine 12. The timing and charging system 24 includes an error limiter counter 60 which is operative during crank-up, i.e., speeds of the engine 12 below 350 ERPM to supply a single missing pulse to the phase locked loop 26. In the absence of a pulse to the phase locked loop 26, the output pulse of the divide-by-N counter 58 will cause the phase comparator 42 to discharge the signal stored by the filter storage 44, thereby tending to rapidly decrease the frequency of the Fvco signal. Under these conditions, the phase comparator 42 generates and applies a deceleration signal to reset and enable the error limiter counter 60 to count a 4 KHz clock signal. In an illustrative embodiment of this invention, the phase comparator 42 is comprised of two "D" flip flops. If an SPU signal is delayed with respect to the output pulse of the divide-by-N counter 58 or is missing, one of the two "D" flip flops is set to provide an output signal as applied to eliminate the reset of the error limiter counter 60. The counter 60 then counts a real time clock pulse; after a count of 56 of the four KHz clock signal, corresponding to 14 milliseconds, the error limiter counter 56 indicates that crankshaft 14 has stopped or at least severly slowed and outputs a missing pulse to be applied via the OR gate 54 to the phase locked loop 26. At higher engine speeds, the length of the deceleration pulse as output by the phase comparator 42 of the phase locked loop 26 will not exceed 14 milliseconds and, therefore, the error limiter counter 60 is effectively disabled at higher speeds. The insertion of missing pulses or pulse, whether by the two pulse insertion counter 78 or the error limiter counter 60, prevents discharging of the filter storage 44, as would otherwise occur in the absence of inputted SPU signals, and, thereby, maintains the accuracy of the output Fvco of the phase locked loop 26; as a result, the timing operations as carried out by the missing pulse counter 62 and the other timing counters of the timing and charging system 24 is ensured.

As shown in FIG. 2A, the output of the missing pulse counter 62 is also applied to set a flip flop 64; the output $\overline{Q}$ of the flip flop 64 is coupled to the reset of a no run counter 80. The output pulse of the error limiter counter 60 is applied to reset the flip flop 64, which resets and disables the no run counter 80 to a no run condition. In particular, the no run counter 80 is reset and enabled from flip flop 64 by the counter reset going low allowing the clock input to the counter 80 to count SPU pulses. The modulo of the counter 80 is set at value nine so that in the event nine SPU pulses do not arrive after the 2 missing pulses are detected, the counter 80 would not time out thus leaving its output to AND gate 103 low, thus preventing coil outputs to occur after 12 BTDC, which is the 9th protrusion 18 past the 2 missing protrusions. Under normal circumstances, if the engine 12 is rotating above 25 ERPM, the error limiter counter 60 will not count out and will not reset the no run counter 80, before it counts nine or more SPU signals to output a run or high signal to the AND gate 103, whereby the AND gate 103 is enabled to apply and dwell signals to the AND gates to permit energization of the ignition coils 36. The no run counter 80 determines whether the crankshaft 14 is in a no run condition, i.e., has stopped or is rotating at a very slow speed of less than 25 ERPM. If the crankshaft 14 is rotating at less than 25 ERPM or is stopped, the sensor 20 will not produce pulses as the protrusions 18 rotate there past. As a result, the synchronization counter 70 no longer provides accurate data indicative of crankshaft position. Thus if the crankshaft 14 were to restart or to accelerate rapidly, the output of the synchronization decoding circuit 72 and the coil ID counter 84 could be in error, thus causing a misfire whereby a spark plug 39 is fired when a cylinder valve is opened, thus possibly causing a carburetor fire. Thus, the no run counter 80 functions to determine a no run condition and, thus, to reset the synchronization counter 70 and the coil ID counter 84 and, further, to disable the AND gate 103 to prevent the spark plugs 39 from being fired.

As explained above, the coil drivers 38 are selectively turned on and off to charge the respective ignition coils 36 for a four cylinder engine 12 illustrated in the wave forms of FIGS. 3A–3Z. In particular, a coil driver 38b is turned on and its corresponding ignition coil 36b, is permitted to charge for that interval as illustrated in FIG. 3U, whereas the coil driver 38c and its ignition coil 36c are turned on for that interval illustrated in FIG. 3T. When the actuating signals applied to the coil drivers 38b and 38c are removed, spark ignition 38 occurs as shown in FIG. 3O. The timing of when a driver 38 is turned on is controlled by a dwell counter 98, as shown in FIG. 2A. The interval that the drivers 38 are turned on is termed the dwell angle, and is controlled, as will be explained, to permit the corresponding ignition coil 36 to sufficiently charge. The period, as shown in FIG. 3R, from SI to the turn-on of the drivers 38 is termed the anti-dwell period and is timed by the dwell counter 98. As explained above and shown in FIG. 3P, the variable crankshaft arc terminating at SI, is timed from a point 60° BTDC by a position counter 90, as initialized by the 60° BTDC signal outputted from the synchronization decoding circuit 72. When the position counter 90 times out, as shown in FIG. 3P or 3N, SI occurs as shown in FIG. 3Q or 3O at which time energization is removed from ignition coil 36 and a firing current applied to its spark plug 39.

Referring to FIG. 2B, the 60° BTDC signal outputted by the synchronization decoding circuit 72 is applied to trigger a monostable 117. The 60° BTDC pulse, as shown in FIG. 3J, is 6° wide. Monstable 117 is triggered on the positive edge of the 60° BTDC pulse and outputs a one microsecond pulse to set position flip flop 92. Thus, the flip flop 92 is held on set only for the microsecond and can be reset by the output of the position counter 90 any time after one microsecond. When the position flip flop 92 is set, its $\overline{Q}$ output is applied to the load input of the position counter 90, whereby the 8 bit signal calculated by the microcomputer 28, as seen in FIG. 1, is loaded into the position counter 90. As explained above, the synchronization decoding circuit 72 outputs an interrupt signal to the $\overline{IRQ}$ terminal of the microcomputer 28 to initiate the calculation of the 8 bit data representing the spark advance angle $\theta a$. When the $\overline{Q}$ signal goes low the position counter 90 counts the output signal Fvco of the phase locked loop 26 to decrement the loaded 8 bit signal indicative of the spark advance angle $\theta a$. Upon overflowing, the position counter 90 outputs at its terminal CO a signal occurring at SI, as seen in FIGS. 3Q or 3O, to reset the position flip flop 92 in preparation to receive the next 60° BTDC signal from the synchronization decoding circuit 72.

The scale set by the VCO 46 of the phase locked loop 26 provides 25.5 pulses of the Fvco signal for each SPU signal. The SPU signals are spaced exactly 6° apart, whereby the number of Fvco pulses for a 60° crankshaft rotation is $10\times25.5$ corresponding to the capacity of the 8 bit position counter 90. Such scaling permits the 8 bit signal calculated by the microcomputer 28 to vary from a value 000 corresponding to 0° BTDC or TDC and a value of 255 corresponding to 60° BTDC. In other words, the 8 bit data signal derived from the microcomputer 28 permits the spark advance angle $\theta a$ to occur anywhere between 60° BTDC and TDC to provide a resolution 0.25° of crankshaft resolution ($60/255=\frac{1}{4}°$).

When the position counter 90 overflows, its output signal is applied via an OR gate 94 to set a dwell flip flop 96, whereby its $\overline{Q}$ output is applied to the load input of the dwell counter 98, whereby the 8 bit data signal calculated by a coil on angle counter 104 is loaded into the dwell counter 98. As explained above and shown in FIG. 1, a voltage as developed across the resistor R1 and illustrated in FIG. 3V, is compared with a reference signal indicative of one-half of the desired current. The coil on angle counter 104 counts $2K_1$Fvco from the scaling counter 106 starting from the time the dwell flip flop 96 is reset until the time one-half the desired coil current is reached and comparator 32 goes high, thus resetting the flip flop 115 and disabling the counting of the coil on counter 104. The comparator 32 goes high, when an ignition coil 36 has charged to one-half the desired current. The coil on angle counter 104 operates as an analog to digital converter to convert the analog time required for ignition coil 36 to reach one-half the desired coil current into an 8 bit signal proportional to the arc of crankshaft rotation occurring during this time. The coil on angle counter 104 counts a clock signal $2K_1$Fvco, so that its digital output signal is indicative of the time and the arc of crankshaft rotation required for the ignition coils 36 to become fully energized. The scaling factor $K_1$ is changed so that the full range of the counter 104 covers 180° for four and eight cylinder engines and 120° for six cylinder engines. The reference signal indicative of one-half the desired current is set so that if the battery voltage as generating the current applied to the ignition coils 36, is low and may not otherwise supply a current of the desired level that the current applied to the ignition coils 36 will at least increase to the reference level and will cause the comparator 32 to initiate counting, as described above.

The dwell counter 98 is an 8 bit presettable counter similar to the position counter 90. The scale of the dwell counter 98 is set by a scale counter 105 for varying the frequency of the signal Fvco by a factor K2, as set by the cylinder select mixer 82. The dwell counter 98 is scaled for a four or eight cylinder engine from 0° to 180°, as shown in FIGS. 3A–3Z, and for a six cylinder engine from 0° to 120°. When the dwell counter 98 counts out, its output CO is applied through an OR gate 100 to reset the dwell flip flop 96, thus rendering its $\overline{Q}$ output high to enable the AND gate 103 and to turn on a selected one of the coil drivers 38, as described above.

An AND gate 102, as shown in FIG. 2A, implements a back-up or redundant fire function. In particular, the synchronization decoding circuit 72 generates its 12° BTDC signal, which is applied to one input of the AND gate 102, whereas the other input is derived from the Q output of the position flip flop 92. If the position counter 90 has not timed out to effect SI, the $\overline{Q}$ output of the position flip flop 92 is high, whereby the 12° BTDC signal is passed through the enabled AND gate 102 and the OR gate 100 to reset the dwell flip flop 96 and thereby to commence the energization of a selected ignition coil 36. At TDC, the TDC signal of the synchronization decoding circuit 72 is applied through the OR gate 94 to set the dwell flip flop 96 to terminate the energization of the selected ignition coil 36 and to effect SI.

An indication of motor speed or ERPM is provided over two ranges of 0 to 4,000 ERPM and 0 to 8,000 ERPM. As indicated in FIG. 2B, the output signal Fvco of the phase locked loop 26 is applied to trigger a monostable 117, which in turn sets a flip flop 114, whose $\overline{Q}$ output resets an ERPM HI counter 110 to count a 2 MHz signal provided from the crystal oscillator 30. The monostable 117 is triggered on the positive edge of the Fvco signal to output a one microsecond pulse so that flip flops 114 and 116 are not held on set for a long period of time. The counter 110 overflows to reset the flip flop 114, whereby its Q outputs a pulse of a width equal to 5 microseconds and a frequency proportional to ERPM. This output pulse is applied to be integrated by a low pass filter comprised of the capacitor C2 and resistor R3, as shown in FIG. 1, to output a voltage is indicative of ERPM. Similarly, the Fvco signal is applied to set a flip flop 116, whereby the $\overline{Q}$ output resets an ERPM LO counter 112. The counter 112 overflows to reset the flip flop 116, whereby its Q output generates a pulse of a 10 microsecond width to be applied to a low pass filter comprised of the capacitor $C_1$ and resistor $R_2$, as shown in FIG. 1, to output a voltage proportional to the 0 to 4,000 ERPM. The different scaling is effected by applying a 2 MHz signal to be counted by the counter 110, and a 1 MHz signal to be counted by the counter 112.

In considering this invention, it should be remembered that the present disclosure is illustrative only and the scope of the invention should be determined by the appended claims.

I claim:

1. An electronic ignition system for controlling as a function of at least one selected engine parameter the ignition instant of an internal combustion engine having at least one cylinder, said cylinder having a piston and a rotatable crankshaft coupled to said piston to be rotatably driven as combustion occur within said cylinder at said ignition instants, said crankshaft having at least one reference position defining a positional relationship of said crankshaft to said cylinder, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a train of signals, each signal occurring in time when each of said plurality of reference indicia rotates past said fixed point (c) missing indicium means responsive to each sensor signal of said train for measuring an arc of crankshaft rotation from the corresponding, current indicium, and if said measured arc of crankshaft rotation exceeds said predetermined arc of crankshaft rotation, for providing a missing indicium signal; and (d) closed loop circuit means comprising comparison means coupled to [received] *receive* said first mentioned train of sensor signals for providing an error signal, oscillator means responsive to said error signal for providing a corrected, second train of signals of a frequency proportional to said error signal, and feedback means for coupling said second train of signals to said comparison means, whereby said comparison means provides said error signal as a function of the phase difference between said signals of said first mentioned and said second trains.

2. The electronic ignition system as claimed in claim 1, wherein said reference position is 60° BTDC.

3. The electronic ignition system as claimed in claim 1, wherein there is further included control means for initiating a variable arc of crank shaft rotation and responsive to said one selected engine parameter for terminating said variable crankshaft arc to effect combustion at said ignition instant.

4. The electronic ignition system as claimed in claim 1, wherein there is included crankshaft position means initiated by said missing indicium signal for counting said sensor signals of said train to provide a manifestation indicative of crankshaft position.

5. The electronic ignition system as claimed in claim 4, wherein said crankshaft position means provides an initiate signal indicative of the beginning of a variable arc of crankshaft rotation at a predetermined position with respect to said reference position, and ignition timing means responsive to said initiate signal for measuring said variable crankshaft arc in response to said train of sensor signals to produce an ignition signal, when said measured crankshaft arc equals said variable crankshaft arc set as a function of said one selected engine parameter.

6. The electronic ignition system as claimed in claim 1, wherein there is included means for generating and applying a signal to said comparison means at a point in time corresponding to when said missing indicium would have rotated past said fixed sensor point, whereby the frequency of said second train of signals is not affected by the absence of one of said first mentioned train of sensor signals corresponding to said missing indicium.

7. The electronic ignition system as claimed in claim 1, wherein there is included means responsive to said missing indicium signal for generating and applying in said first mentioned train a signal in place of the missing sensor signal to said comparison means, whereby the frequency of said second train of signals is not affected by the absence of one of said sensor signals of said first train.

8. The electronic ignition system as claimed in claim 1, wherein there is included multiplying means for scaling said first mentioned train of sensor signals by a given factor to provide a second train of signals of an increased frequency indicative of the rotational velocity of said crankshaft, said missing indicium means comprises a counter initiated by each sensor signal of said first mentioned train for counting said signals of said second train to provide said missing indicium signal, when said counted signals of said second train exceeds said predetermined arc of crankshaft rotation.

9. The electronic ignition system as claimed in claim 1, wherein there is included crankshaft position means initiated by said missing indicium signal for counting said signals of said second train to provide an initiate signal indicative of the beginning of a variable arc of crankshaft rotation at a predetermined position with respect to said reference position, and a position counter responsive to said initiate signal for counting said signals of said second train to produce an ignition signal, when said measured crankshaft arc equals said variable crankshaft arc set as a function of said one selected engine perimeter.

10. The electronic ignition system as claimed in claim 1, wherein there is included crankshaft position means initiated by said missing indicium signal for counting at least one further sensor signal of said train to provide an initiate signal indicative of the beginning of a variable arc of crankshaft rotation at a predetermined position with respect to said reference position.

11. The electronic ignition system as claimed in claim 10, wherein there is further included ignition timing means responsive to said initiate signal for measuring said variable crankshaft arc in response to said train of sensor signals to produce an ignition signal, when said measured crankshaft arc equals said variable crankshaft arc set as a function of said one selected engine perimeter.

12. An electronic ignition system for controlling as a function of a selected engine parameter the ignition instant of an internal combustion engine having a plurality of cylinders, each cylinder having a corresponding piston, and a rotatable crankshaft coupled to each of said pistons to be rotatably driven as combustion occur at said ignition instants in an ordered sequence of said plurality of cylinders, said crankshaft having at least one reference position defining a positional relationship of said crankshaft to at least a selected one of said plurality of cylinders, said electronic ignition system comprising:

(a) a rotor affixed to rotate with said crankshaft and having a plurality of indicia, said indicia being disposed at points equally spaced by a predetermined arc of crankshaft rotation from each other about said rotor, at least one of said points having a missing indicium and disposed in a predetermined relation to said one reference position;

(b) means for directly coupling said rotor to said crankshaft without substantial variance in the angular positions of said rotor and said crankshaft relative to each other;

(c) a single sensor disposed at a sensor position fixed in relation to the rotation of said crankshaft for providing a first train of sensor signals, each sensor signal occurring in time when each of said plurality of reference indicia rotates past said fixed sensor position;

(d) missing indicium means responsive to each sensor signal of said train for measuring an arc of crankshaft rotation from the corresponding, current indicium, and if said measured arc of crankshaft rotation exceeds said predetermined arc of crankshaft rotation, for providing a missing indicium signal;

(e) crankshaft position means responsive to said missing indicium signal for initiating the counting of said first train of sensor signals to provide an initiating manifestation indicative of that position of said crankshaft relative to said reference position, at which a variable arc of crankshaft rotation begins;

(f) ignition timing means responsive to said initiating manifestation for initiating the counting in response to said sensor signals of a count selected as a function of said selected engine parameter and for terminating at counter overflow said variable arc of crankshaft rotation to provide an ignition signal at said ignition instant; and (g) cylinder identifying means responsive to said initiating manifestation for selecting a first cylinder of said ordered sequence for ignition and responsive to said ignition signal for selecting the next cylinder of said ordered sequence.

13. The electronic ignition system as claimed in claim 12, wherein said crankshaft position means is responsive to the number of ignition events to occur within a single revolution of said crankshaft for providing a corresponding number of initiating signals, each occurring as said crankshaft assumes said positional relationship with a corresponding one of said plurality of cylinders.

14. [An] *A high resolution distributorless* electronic ignition system for controlling a dwell period and an anti-dwell period of [an] *a multi-cylinder* internal combustion engine, said internal combustion engine having [at least one cylinder] *plural cylinders*, a piston disposed within *each of* said [cylinder, an] *cylinders, at least one* ignition coil [spark plug coupled to said ignition coil,] *arranged to generate spark within said cylinders*, a voltage source, and a rotatable [crankshaft] *shaft* coupled to said [piston] *pistons* to be rotatably driven as combustions occur within said [cylinder] *cylinders*, said [crankshaft] *shaft* having at least one reference position defining [the] *a* positional relationship of said [crankshaft] *shaft* to *at least one of* said [cylinder,] *cylinders, a rotor having sensible indicia being operatively coupled to said shaft, a single sensor for sensing said sensible indicia being operatively coupled to said rotor, said single sensor providing sensor pulses indicative of passage of said sensible indicia relative to said sensor*, said *distributorless* electronic ignition system comprising:

(a) switch means for [applying] *coupling* said voltage source to said ignition coil to initiate said dwell period and for disconnecting said voltage source from said ignition coil at spark instant to terminate the dwell period and effect combustion within said [cylinder] *cylinders in a firing order sequence of said cylinders;*

(b) *coil current feedback* means, responsive to the [increasing] current [applied] *induced* by said voltage source to *flow through* said ignition coil *and responsive to said sensor pulses*, for measuring [that arc] *the amount* of [crankshaft] *shaft* rotation required [until] *for* said current [energizes] *to energize* said ignition coil to a reference level; and (c) control means *responsive to said sensor pulses* for [deactuating] *controlling* said switch means to:(*i*) disconnect said voltage source from said ignition coil *at a spark instant targeted in response to said sensor pulses* to thereby initiate said anti-dwell period [and for actuating said switch means to], *and* (*ii*) apply said voltage source to said ignition coil to thus terminate said anti-dwell period after [a variable arc] *an amount* of [crank] shaft rotation [set in accordance with said measured arc] *that is varied in response to said measured shaft rotation amount* to ensure that said ignition coil is sufficiently energized [as indicated by said reference level,] regardless of [crankshaft] *shaft* rotational [velocity] *speed* and voltage source condition, *said control means being capable of accurately targeting spark instant to desired instants between consecutive said sensor pulses.*

15. [An] *A distributorless* electronic ignition system controlling as a function of at least one selected engine parameter the ignition instant of an internal combustion engine having at least one cylinder, said cylinder having a piston and a rotatable crankshaft coupled to said piston to be rotatably driven as combustions occur within said cylinder at ignition instant, said crankshaft having at least one reference position defining a positional relationship of said crankshaft to said cylinder, said electronic [electronic] ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a train of sensor signals, each sensor signal occurring in time as each of said plurality of said reference indicia rotates past said fixed point;

(c) missing indicium means responsive to each sensor signal of said train for measuring an arc of crankshaft rotation from the corresponding, current indicium and, if said measured arc of crankshaft rotation exceeds said predetermined arc of crankshaft rotation, for providing a missing indicium signal; and (d) crankshaft position means responsive to said missing indicium and at least one sensor signal of said train to provide an initiate signal indicative of the beginning of a variable arc of crankshaft rotation at a predetermined position with respect to said reference position, wherein there is further included ignition timing means responsive to said initiate signal for measuring said variable crankshaft arc in response to said train of sensor signals to produce an ignition signal, when said measured crankshaft arc equals said variable crankshaft arc set as a function of said one selected engine parameter.

[16. The electronic ignition system as claimed in claim 15, wherein there is further included ignition timing means responsive to said initiate signal for measuring said variable crankshaft arc in response to said train of sensor signals to produce an ignition signal, when said measured crankshaft arc equals said variable crankshaft arc set as a function of said one selected engine parameter.]

17. An electronic ignition system for controlling as a function of a selected engine parameter the ignition instants of an internal combustion engine having a plurality of cylinders, each cylinder having a corresponding piston, and a rotatable crankshaft coupled to each of said pistons to be rotatably driven as combustions occur at said ignition instants in an ordered sequence of said plurality of cylinders, where N ignition events occur within said cylinders per revolution of said crankshaft, said crankshaft having at least one reference position defining a positional relationship of said crankshaft to at least a selected one of said plurality of cylinders, said electronic ignition system comprising:

(a) a rotor affixed to rotate with said crankshaft and having a plurality of indicia, said indicia being disposed at points equally spaced by a predetermined arc of crankshaft rotation from each other about said rotor, at least one of said points having a missing indicium and disposed in a predetermined relation to said one reference position;

(b) a single sensor disposed at a sensor position fixed in relation to the rotation of said crankshaft for providing a train of sensor signals, each sensor signal occurring in time as each of said plurality of said reference indicia rotates past said fixed sensor position;

(c) missing indicium means responsive to each sensor signal of said train for measuring an arc of crankshaft rotation from the corresponding, current indicium and, if said measured arc of crankshaft rotation exceeds said predetermined arc of crankshaft rotation, for providing a missing indicium signal;

(d) crankshaft position means responsive to said missing indicium signal and at least one sensor signal of said train to provide an initiate signal indicative of said position of said crankshaft relative to said reference position of said selected one cylinder, at which a variable arc of crankshaft rotation beings to define the ignition instant of a corresponding cylinder; and (e) synchronization means responsive to said initiate signal and to said N number of ignition events per crankshaft revolution, for generating a sequence of N initiating signals, each initiate signal occurring at a time corresponding to said position of said crankshaft relative to said reference position of a corresponding one of said plurality of cylinders.

18. The electronic ignition system as claimed in claim 17, wherein to each of said initiate signals for initiating the counting in response to said sensor signals a count selected as a function of said selected engine perimeter and for terminating at counter overflow said variable arc of crankshaft rotation to provide an ignition signal at said ignition instant.

19. The electronic ignition system as claimed in claim 17, wherein there are M of said points disposed about said rotor, and the quotient of M divided by N is a whole number.

20. The electronic ignition system as claimed in claim 17, wherein there is only K sequential points having missing indicium disposed about said rotor, where K equals at least 1.

21. The electronic ignition system as claimed in claim 17, wherein there are 60 of said points disposed about said rotor.

22. An electronic ignition system for controlling as a function of at least one selected engine parameter the ignition instants of an internal combustion engine having at least one cylinder, said cylinder having a piston and a rotatable crankshaft coupled to said piston to be rotatably driven as combustions occur within said cylinder at said ignition instants, said crankshaft having at least one reference position defining a positional relationship of said crankshaft to said cylinder, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a train of signals, each signal occurring in time when each of said plurality of reference indicia rotates past said fixed point;

(c) missing indicium means responsive to each sensor signal of said train for measuring an arc of crankshaft rotation from the corresponding, current indicium, and if said measured arc of crankshaft rotation exceeds said predetermined arc of crankshaft rotation, for providing a missing indicium signal;

(d) crankshaft position means initiated by said missing indicium signal for counting said sensor signals of said train to provide a manifestation indicative of crankshaft position, said crankshaft position means provides an initiate signal indicative of the beginning of a variable arc of crankshaft rotation at a predetermined position with respect to said reference position;

(e) ignition timing means responsive to said initiate signal for measuring said variable crankshaft arc in response to said first-mentioned train of sensor signals to produce an ignition signal, when said measured crankshaft arc equals said variable crankshaft arc set as a function of said one selected engine parameter; and (f) closed loop circuit means comprising comparison means coupled to receive said first mentioned train of sensor signals for providing an error signal, oscillator means responsive to said error signal for providing a second train of signals of a frequency proportional to the rotational velocity of said crankshaft, and feedback means for coupling said second train of signals to said comparison means, whereby said comparison means provides said error signal as a function of the phase difference between said signals of first mentioned and said second trains.

23. The electronic ignition system as claimed in claim 22, wherein said crankshaft position means provides a last signal indicative of the passage of that reference indicium immediately preceding said missing indicium, and missing indicium means responsive to said last signal for generating and applying to said comparison means a signal in place of that as would have been generated by said missing indicium, whereby said frequency of said second train of signals is not affected by said missing indicium.

24. The electronic ignition system as claimed in claim 23, wherein said missing indicium means comprises a counter initiated by each sensor signal of said first mentioned train for counting said signals of said second train to provide said missing indicium signal when said counted signals of said second train exceeds said predetermined arc of crankshaft rotation.

25. An electronic ignition system for controlling a dwell period and an anti-dwell period of an internal combustion engine, said internal combustion engine having at least one cylinder, a piston disposed within said cylinder, an ignition coil, a spark plug coupled to said ignition coil, a voltage source, and a rotatable crankshaft coupled to said piston to be rotatably driven as combustions occur within said cylinder, said crankshaft having at least one reference position defining the positional relationship of said crankshaft to said cylinder, said electronic ignition system comprising:

(a) switch means for applying said voltage source to said ignition coil to initiate said dwell period and for disconnecting said voltage source from said ignition coil at spark instant to terminate the dwell period and effect combustion within said cylinder;

(b) means responsive to the increasing current applied by said voltge source to said ignition coil for measuring that arc of crankshaft rotation required until said current energizes said ignition coil to a reference level;

(c) control means for deactuating said switch means to disconnect said voltage source from said ignition coil to thereby initiate said anti-dwell period and for actuating said switch means to apply said voltage source to said ignition coil to thus terminate said anti-dwell period after a variable arc of crankshaft rotation set in accordance with said measured arc to ensure that said ignition coil is sufficiently energized as indicated by said reference level, regardless of crankshaft rotational velocity and voltage source condition;

(d) means for generating a train of signals of a frequency proportional to the rotational velocity of said crankshaft;

(e) means for comparing the increased amplitude of the current applied to said ignition coil to provide a termination signal when said current applied to said ignition coil exceeds said predetermined level; and (f) said measuring means comprising a counter initiated at the end of said anti-dwell period for counting said train of signals and responsive to said termination signal for terminating the counting of said train of signals to provide a manifestation indicative of said arc of crankshaft rotation.

26. The electronic ignition system as claimed in claim 25, wherein there is included a scaling counter for scaling the frequency of said train of signals as applied to said counter in accordance with said reference level to ensure that said crankshaft arc manifestation will effect the sufficient energization of said ignition coil.

27. The electronic ignition system as claimed in claim 25, wherein there is included a second counter for initiating the counting of said train of signals when said one reference position of said crankshaft rotates past a point fixed with respect to the rotation of said crankshaft and for terminating counting of said train of signals when said counted signals equal said selected engine parameter to set said spark instant and to terminate the dwell period.

28. The electronic ignition system as claimed in claim 27, wherein said control means includes a third counter initiated at spark instant for counting said train of signals and upon counting over a count corresponding to said measured arc, terminating said anti-dwell period.

29. The electronic ignition system as claimed in claim 28, wherein there is included a scaling counter for scaling the frequency of said train of signals as applied to said third counter dependent upon the number of ignition events per revolution of said crankshaft.

30. The electronic ignition system for controlling as a function of at least one selected engine parameter the ignition instants of an internal combustion engine having at least one cylinder, said cylinder having a piston and a rotatable crankshaft coupled to said piston to be rotatably driven as combustions occur within said piston at said ignition instants, said crankshaft having at least one reference position defining a positional relationship of said crankshaft to said cylinder, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a first train of signals of a first frequency, each signal occurring in time when each of said plurality of reference indicia rotates past said fixed point;

(c) closed loop circuit means comprising comparison means coupled to receive said first train of signals for providing an error signal, frequency increasing means for providing a second train of signals of a second frequency greater than said first frequency and proportional to said error signal, and feedback means for coupling said second train of signals to said comparison means, whereby said comparison means provides said error signal as a function of the phase difference between corresponding signals of said first and second trains; and (d) missing indicium means responsive to each sensor signal of said first train for counting said second train of signals to provide a manifestation indicative of a measured arc of crankshaft rotation from the corresponding, current indicium, and if said measured arc of crankshaft rotation exceeds said predetermined arc of crankshaft rotation, for providing a missing indicium signal.

31. The electronic ignition system as claimed in claim 30, wherein said frequency increasing means comprises a voltage controlled oscillator.

32. The electronic ignition system as claimed in claim 30, wherein said closed loop circuit means further comprises integration means coupled to said comparison means for integrating and storing said error signal to provide an integrated output thereof to said frequency increasing means.

33. The electronic ignition system as claimed in claim 32, wherein said integration means comprises a capacitor to be charged and discharged by said error signal.

34. The electronic ignition system as claimed in claim 30, wherein there is included means responsive to said missing indicium signal for generating and applying to said comparison means a replacement signal in place of that missing signal as would have been generated if said missing indicium were present, whereby the frequency of said second train of signals is not affected by the absence of said missing signal of said first train.

35. The electronic ignition system as claimed in claim 30, wherein there is included means for generating and applying a replacement signal to said comparison means at a point in time corresponding to when said missing indicium would have rotated past said fixed sensor point, whereby the frequency of said second train of signals is not affected by the absence of one signal of said first train corresponding to said missing indicium.

36. The electronic ignition system as claimed in claim 30, wherein there is included means responsive to consecutive signals of said first train for measuring the time interval therebetween and, if said measured time interval is greater than a predetermined interval, for inserting an extra signal into said first train to be applied to said comparison means, whereby the frequency of said second train of signals is maintained.

37. The electronic ignition system as claimed in claim 36, wherein said measuring means comprises a counter responsive to each signal of said first train for counting a clock signal to provide said indication of said time interval.

38. The electronic ignition system as claimed in claim 36, wherein there is further included means responsive to said extra signal for counting said signals of said first train and, if greater than a predetermined number indicative that the rotation of said crankshaft is less than a predetermined rotational velocity for defeating further of said ignition instants.

39. The electronic ignition system as claimed in claim 38, wherein said defeating means comprises a no run counter for counting said signals of said first train.

40. The electronic ignition system as claimed in claim 39, wherein said missing indicium means comprises a missing pulse counter responsive to each signal of said first train for counting signals of said second train for providing said missing indicium signal if said count exceeds a predetermined count, each of said extra signals initiating the counting of said no run counter, said missing indicium signal defeating said counting initiating of said no run counter.

41. The electronic ignition system as claimed in claim 30, wherein said internal combustion engine comprises a plurality of cylinders to be ignited in an ordered sequence, each of said cylinders including an ignition coil and a spark plug coupled to said ignition coil, and said electronic ignition system further comprises a coil decoder responsive to each missing indicium signal for selecting a first cylinder of said ordered sequence for ignition.

42. The electronic ignition system as claimed in claim 41, wherein there is included ignition timing means responsive to said signals of said second train for determining an end of a variable arc of crankshaft rotation to provide an ignition signal threat, said coil decoder responsive to each of said ignition signals for selecting the next cylinder of said ordered sequence for ignition.

43. The electronic ignition system for controlling as a function of at least one selected engine parameter a sequence of ignition instants of an internal combustion engine having a plurality of cylinders, each of said cylinders having a piston and a rotatable crankshaft coupled to said piston to be rotatably driven as combustions occur within said cylinders at respective ignition instants, said crankshaft having at least one reference position defining a positional relationship of said crankshaft to at least a selected one of said plurality of cylinders, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a first train of signals of a first frequency, each signal of said first train occurring in time as each of said plurality of said reference indicia rotates past said fixed point;

(c) missing indicium means responsive to each signal of said first train for measuring an arc of crankshaft rotation from the corresponding, current indicium and, if said measured arc of crankshaft rotation exceeds said predetermined arc of crankshaft rotation, for providing a missing indicium signal;

(d) crankshaft position means responsive to each of said missing indicium signals for initiating the counting of said signals of said first train to provide a series of crankshaft position signals corresponding to selected of said reference indicium;

(e) means [coupled to receive said first train of signals] for providing a second train of signals of a second frequency greater than said first frequency; and (f) ignition timing means responsive to selected of said crankshaft position signals for initiating the counting said signals of said second train and, upon obtaining a count selected as a function of said selected engine parameter, for providing an ignition signal at said ignition instant.

44. The electronic ignition system as claimed in claim 43, wherein each cylinder of said plurality includes an ignition coil and a sparkplug coupled to said ignition coil, and there is further included a coil counter responsive to each missing indicium signal for initiating the counting of said ignition signals to thereby control the sequential application of current to said ignition coils.

45. An electronic ignition system for controlling a dwell period and an anti-dwell period of an internal combustion engine, said internal combustion engine having at least one cylinder, a piston disposed within said cylinder, an ignition coil, a spark plug coupled to said ignition coil, a voltage source, and a rotatable crankshaft coupled to said piston to be rotatably driven as combustions occur within said cylinder, said crankshaft having at least one reference position defining the positional relationship of said crankshaft, to said cylinder, said electronic ignition system comprising:

(a) switch means for applying said voltage source to said ignition coil to initiate said dwell period and for disconnecting said voltage source from said ignition coil at spark instant to terminate said dwell period and effect combustion within said cylinder;

(b) means for generating a first train of signals of a first frequency proportional to the rotational velocity of said crankshaft;

(c) means [coupled to receive said first train of signals] for providing a second train of signals of a second frequency greater than said first frequency;

(d) ignition timing means for measuring a first variable arc of crankshaft rotation set as function of at least one selected engine parameter, said first variable arc starting at a reference position defining a positional relationship of said crankshaft to said cylinder, said ignition timing means comprising a first counter initiated as said crankshaft rotates past said reference position for counting said signals of said second train and, upon obtaining a first count corresponding to said first variable arc for providing an ignition signal at said spark instant; and (e) means for controlling said anti-dwell period as a function of a second variable arc of crankshaft rotation set to insure that said ignition coil is sufficiently energized, said controlling means for initiating said second variable arc at spark instant to deactuate said switch means to disconnect said voltage source from said ignition coil and for terminating said second variable arc to actuate said switch means thus applying said voltage source to said ignition coil, said controlling means comprising a second counter initiated at spark instant for counting said signals of said second train and upon counting a count corresponding to said second variable arc for terminating said anti-dwell period.

46. The electronic ignition system as claimed in claim 45, wherein said means for providing said second train of signals comprises a voltage controlled oscillator *responsive to said first train of signals, said voltage controlled oscillator producing said second train of signals at said second frequency, and wherein said second frequency is proportional to said first frequency.*

47. The electronic ignition system for controlling as a function at least one selected engine parameter the spark instants of an internal combustion engine having at least one cylinder, said cylinder having a piston and a rotatable crankshaft coupled to said piston to be rotatably driven as combustions occur within said piston at said spark instants, said crankshaft having at least one reference position defining a positional relationship of said crankshaft to said cylinder, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a first train of signals of a first frequency, each signal occurring in time when each of said plurality of reference indicia rotates past said fixed point;

(c) closed loop circuit means comprising comparison means coupled to receive said first train of signals for providing an error signal, an integrating means coupled to said comparison means for integrating said error signal to provide an integrated output, and means for providing a second train of signals of a second frequency proportional to said integrated output and greater than said first frequency, and feedback means for coupling said second train signals to said comparison means, said comparison means provides said error signal as long as there is a phase difference between corresponding signals of said first and second trains, said error signal being indicative of whether said signals of said first train leads or lags said signals of said second train, whereby said second frequency varies accordingly; and (d) missing indicium means responsive to each signal of said first train for counting said second train of signals to provide a manifestation indicative of a measured arc of crankshaft rotation from the corresponding, current indicium, and if said measured arc of crankshaft rotation exceeds said predetermined arc of crankshaft rotation, for providing a missing indicium signal.

48. The electronic ignition system as claimed in claim 47, wherein in the absence of one of said signals of said first train said comparison means tends to vary said second frequency, and there is further included means responsive to said missing indicium signal for generating and applying in said first train a replacement signal in place of said missing signal to said comparison means, whereby said second frequency is not affected by the absence of one of said signals of said first train.

49. The electronic ignition system as claimed in claim 47, wherein there is included means for measuring the time interval between consecutive signals of said first train and, if said measured time interval exceeds a predetermined time interval, for applying in said first train an added signal to said comparison means.

50. The electronic ignition system as claimed in claim 47, wherein said feedback means includes a divider means for decreasing said second frequency of said signals of said second train.

51. An electronic ignition system for controlling as a function of at least one selected engine parameter the ignition instants of an internal combustion engine having at least one cylinder, said cylinder having a piston and a rotatable crankshaft coupled to said piston to be rotatably driven as combustions occur within said piston at said ignition instants, said crankshaft having at least one reference position defining a positional relationship of said crankshaft to said cylinder, said electronic ignition system comprising:

(a) a rotor affixed to rotate with said crankshaft and having a plurality of reference indicia thereon positionally related with respect to said reference position, said reference indicia being disposed at points equally spaced by a predetermined arc of crankshaft rotation from each other about said rotor, at least one of said points having a missing indicium and disposed in a predetermined relation to said reference position of said crankshaft;

(b) a single sensor disposed at a point fixed in relation to the rotation of said crankshaft for providing a first train of signals of a first frequency, each signal of said first train occurring in time when each of said plurality of reference indicia rotates past said fixed point, said first train having a missing signal corresponding to said missing indicium;

(c) means coupled to receive said first train of signals for providing a second train of signals of a second frequency greater than said first frequency, said second frequency tending to vary upon the occurrence of said missing signal;

(d) missing indicium means responsive to each sensor signal of said train for measuring an arc of crankshaft rotation from the corresponding, current indicium, and if said measured arc of crankshaft rotation exceeds said predetermined arc of crankshaft rotation, for providing a missing indicium signal; and (e) means responsive to said missing indicium signal for generating and applying in said first train a replacement signal in place of the said missing signal to said frequency increasing means, whereby said second frequency is not affected by said missing signal.

52. The electronic ignition system as claimed in claim 51, where in there is included means responsive to consecutive signals of said first train for measuring the time interval therebetween and, if said measured time interval is greater than predetermined interval, for inserting an extra signal into said first train to be applied to said comparison means, whereby the frequency of said second train of signals is maintained.

53. The electronic ignition system as claimed in claim 52, wherein there is further included means responsive to said extra signal for counting said signals of said first train and, if greater than a predetermined number indicative that the rotation of said crankshaft is less than a predetermined rotational velocity, for defeating further of said ignition instants.

54. The electronic ignition system as claimed in claim 53, wherein said defeating means comprises a no run counter for counting said signals of said first train.

55. The electronic ignition system as claimed in claim 54, wherein said missing indicium means comprises a missing pulse counter responsive to each signal of said first train for counting signals of second train for providing said missing indicium signal if said count exceeds a predetermined count, each of said extra signals initiating the counting of said no run counter, said missing indicium signal defeating said counting initiating of said no run counter.

*56. A single crankshaft sensor distributorless electronic ignition system for electrical coupling to a spark generator for controlling ignition instants of combustion, in an internal combustion engine system of the type including at least one cylinder with a piston disposed therein, said piston capable of reciprocally travelling within said cylinder, said piston being mechanically coupled to rotatably drive a rotatable engine crankshaft in response to combustion within said cylinder, said cylinder also having an electrically actuatable spark generator operatively coupled thereto, said spark generator producing electrical sparks which trigger combustion within said cylinder, said electronic ignition system comprising:*

*a rotor mechanically coupled to rotate with said crankshaft, said rotor defining plural points separated from one another by equal angular spacings, sensible rotor structures being defined by said rotor at said points, said rotor defining a reference point disposed in predefined fixed positional relationship with respect to said plural points, said reference point indicating said crankshaft angular position and piston have a predefined positional relationship with respect to said cylinder;*

*a single crankshaft sensor operatively coupled to said rotor, said single crankshaft sensor sensing said sensible rotor structures and arranged to generate successive electrical sensor pulses in response to rotation of said rotor structures past said sensor;*

*a pulse generator for producing a train of repetitive pulses at a rate in excess of the pulse repetition rate of said electrical pulses produced by said single crankshaft sensor;*

*a reference point detecting circuit electrically coupled to said pulse generator, said reference point detecting circuit detecting, in response to said electrical sensor pulses, rotation of said reference point past said sensor and producing a detection output signal in response to said detection;*

*a counter coupled to receive and count said successive electrical sensor pulses, said counter being synchronized with said rotor rotation in response to said detection output signal;*

*an engine speed determining circuit electrically coupled to said single crankshaft sensor and connected to receive said electrical sensor pulses, said engine speed determining circuit determining the speed of rotation of said crankshaft, said engine speed determining circuit continually updating said determined speed in response to said electrical sensor pulses;*

*an ignition advance angle specifying circuit coupled to said counter and to said engine speed determining circuit, said ignition advance angle specifying circuit specifying a spark advance angle for said cylinder in response to said determined speed and at least one further engine parameter;*

*a spark instant actuating circuit, operatively coupled to said counter and to said ignition advance angle specifying circuit, said spark instant actuating circuit generating a spark instant control signal adapted for controlling the timing of sparks produced by said spark generator, said spark instant actuating circuit capable of generating said spark instant control signal at timings other than those corresponding to occurrence of said electrical sensor pulses, said spark instant actuating circuit producing said spark instant control signal at a timing specified by said specified spark advance angle in response to (a) said count, and (b) the occurrence of a pulse in said pulse train produced by said pulse generator.*

*57. A system according to claim 56, wherein said sensible structures each comprise a protrusion, and said reference point is defined at an angular position corresponding to at least one of said equally spaced points and comprises at least one missing tooth.*

*58. A system according to claim 56, wherein each of said equal angular spacings corresponds to a predefined arc of crankshaft rotation.*

*59. A system according to claim 56, wherein said reference point detecting circuit detects passage of said reference point at least in part by determining whenever said rotor has rotated through substantially more than a predefined arc of crankshaft rotation without said sensor providing an electrical sensor pulse.*

*60. A system according to claim 56, wherein said pulse generator is coupled to receive said electrical sensor pulses and provides said train of repetitive pulses at a pulse repetition rate responsive to the pulse repetition rate of said sensor pulses.*

*61. A system according to claim 60, wherein said pulse generator multiplies the pulse repetition rate of said sensor pulses to obtain said train of repetitive pulses.*

*62. A system according to claim 61, wherein said pulse generator includes a phase locked loop circuit coupled to receive said electrical sensor pulses at an input, said phase locked loop circuit including a divider for setting a predetermined multiplication factor.*

*63. A system according to claim 56, wherein said single crankshaft sensor comprises a magnetic sensor suitable for sensing magnetic field fluctuations.*

*64. A system according to claim 56, wherein said sensible structures are continually spaced about the periphery of said rotor.*

*65. A system according to claim 56, wherein said reference point indicates said crankshaft is at an angular position such that said piston is sixty degrees from a top dead center position with respect to said cylinder.*

*66. A system according to claim 56, wherein said sensible structures comprise teeth and said reference point detecting circuit comprises a missing tooth detector.*

*67. A system according to claim 56, wherein said reference point detecting circuit includes a missing pulse counter which counts pulses produced by said pulse generator, is reset in response to each said electrical sensor signal, and produces said detection output signal when said pulse count exceeds a certain count.*

*68. A system according to claim 56, wherein said counter includes a synchronization counter which is reset in response to said detection output signal.*

*69. A system according to claim 56, further including a cylinder selection circuit which selects between multiple cylinders of said internal combustion engine system in response to the count output provided by said counter.*

*70. A system according to claim 56, wherein said engine speed determining circuit includes a further counter which generates an output signal responsive to the rate of said pulses produced by said pulse generator.*

*71. A system according to claim 56, further including a missing pulse insertion circuit responsive to said pulse train produced by said pulse generator, said missing pulse insertion circuit generating pulses to compensate for pulses missing from said sensor output.*

*72. A system according to claim 56, wherein said ignition advance angle specifying circuit includes a microprocessor which generates spark advance digital data words responsive to said updated determined speed, said spark advance digital data words having at least eight bit resolution.*

*73. A system according to claim 56, wherein said spark instant actuating circuit includes:*

*an ignition coil,*

*a coil on counter operatively coupled to said sensor, said coil on counter generating a count indicative of the time and/or angular displacement of said crankshaft during which said coil is activated, and*

*an anti-dwell counter different from and coupled to said coil on counter, said anti-dwell counter targeting charging of said ignition coil in response to said count generated by said coil on counter.*

*74. A system according to claim 56, wherein:*

*said counter is reset upon receipt of said detection output signal; and*

*said system further includes a coil selection circuit connected to receive said count output, said coil selection circuit decoding said count output to generate successive coil selection signals specifying an ordered sequence of engine cylinders.*

*75. A high resolution distributorless electronic ignition system for controlling combustion within an internal combustion engine of the type including a rotating shaft and a plurality of cylinders each having a corresponding piston, said pistons driving said shaft to rotate in response to combustion within said cylinders, said electronic ignition system including:*

*a rotor that rotates with said shaft, said rotor having a plurality of angularly spaced sensible structures disposed thereon;*

*a single sensing arrangement operatively coupled to said rotor, said single sensing arrangement for detecting said sensible structures and for producing sensor signals in response to said detection;*

*a reference position detecting circuit connected to receive said sensor signals, said reference position detecting circuit detecting, in response to said sensor signals, when said shaft has rotated to a reference position;*

*a counter, coupled to receive said sensor signals and synchronized by said reference position detecting circuit, said counter providing a count that changes in response to the sensor signals, said count indicating the position of said shaft; and*

*a spark timing circuit, coupled to receive said count and responsive to said sensor signals, said spark timing circuit for accepting engine speed determined in response to said sensor signals and for generating a spark targeting signal for accurately targeting spark instant within said plurality of cylinders in response to said count and said determined engine speed.*

*76. A distributorless electronic ignition system as in claim 75 further including a spark generating and distributing means coupled to said spark timing circuit, said spark generating and distributing means not being coupled to any rotating shaft except via said sensor signals, said spark generating and distributing means coupling high voltage electrical pulses to spark plugs within said plurality of cylinders in a predetermined ordered sequence at timings responsive to said spark targeting signal so as to trigger combustion within appropriate cylinders at desired timings, said spark generating and distributing means including plural direct fire ignition coils each of which is coupled to substantially simultaneously generate a spark in each of two different engine cylinders.*

*77. A distributorless electronic ignition system as in claim 75 further including:*

*at least one direct fire ignition coil;*

*a feedback circuit coupled to said coil for producing an output signal indicating when said coil is charged to a reference level; and*

*control means, coupled to said feedback circuit output signal, to said spark timing circuit and to said coil, said control means for initiating current supply to said coil at timings determined in response to said feedback circuit output and for interrupting current supply to said coil at timings responsive to said spark targeting signal.*

*78. A distributorless ignition system as in claim 75 wherein said rotor defines a circumferential surface, said sensible structures comprise teeth substantially regularly spaced on said rotor circumferential surface, and said single sensor comprises a magnetic sensor that detects passage of said metal teeth thereby,*

*wherein said rotor circumferential surface defines a substantial gap between first and second of said metal teeth, said substantial gap indicating said reference position, said reference position determining circuit detecting, in response to said sensor signals, when said substantial gap has rotated into proximity with said single sensor.*

*79. A high resolution distributorless single crankshaft sensor electronic ignition system for controlling ignition instants within a multi-cylinder internal combustion engine, said internal combustion engine being of the type including a crankshaft and further including a plurality of cylinders each having a corresponding piston, said pistons being operatively coupled to rotatably drive said crankshaft in response to occurrence of combustions within said plurality of cylinders, said crankshaft having a reference position defined with respect to at least one of said plurality of cylinders, said electronic ignition control system including:*

*a rotor operatively coupled to rotate with said crankshaft, said rotor defining a plurality of points angularly spaced about said rotor, said rotor further defining sensible structures disposed on at least some of said points;*

*a single sensor operatively coupled to said rotor, said single sensor producing a train of sensor signals in response to passage of said sensible structures thereby, said sensor signals occurring in response to passage of said sensible structures by said sensor;*

*a crankshaft reference position determining circuit connected to receive said train of sensor signals, said reference position determining circuit detecting, in response to said train of sensor signals, when said crankshaft has rotated to said crankshaft reference position, said crankshaft reference position determining circuit including a counter which counts said sensor signals;*

*a spark timing circuit, coupled to said crankshaft reference position determining circuit, said spark timing circuit generating a spark targeting signal accurately targeting spark instant with respect to instantaneous crankshaft position in response to (a) said detected crankshaft reference position, and (b) said count, said spark timing circuit capable of accurately targeting spark instant between occurrence of said sensor signals;*

*at least one direct fire ignition coil operatively coupled to said plurality of cylinders;*

*a feedback circuit coupled to said coil for producing an output signal indicating when said coil is charged to a reference level; and*

*control means, coupled to said feedback circuit output signal, to said train of sensor pulses, to said spark timing circuit and to said coil, said control means for initiating and disconnecting application of current to said coil in response to said train of sensor pulses, said feedback circuit output and said spark targeting signal.*

*80. A distributorless electronic ignition system as in claim 14 wherein said system includes plural ignition coils, and said system further includes a coil selection circuit coupled to said control means, said coil selection circuit selecting a next one of said plural coils for energization in response to said spark instant.*

*81. A high resolution distributorless electronic ignition system as in claim 14 wherein said control means includes a first counter circuit for measuring said dwell period, and a second counter circuit operatively coupled to said first counter circuit for measuring said anti-dwell period.*

*82. A high resolution distributorless electronic ignition control system as in claim 14 wherein said control means is capable of accurately targeting the beginning of said dwell period between said consecutive sensor pulses.*

*83. A high resolution distributorless electronic ignition control system as in claim 14 wherein said control means includes a redundant fire circuit which determines when said control means has failed to target spark instant and controls said switch means to disconnect said voltage source from said ignition coil at a predetermined value of coil current in response to said coil current sense signal.*

*84. A high resolution distributorless electronic ignition system as in claim 14 wherein said system further includes a counter which counts said sensor pulses, said control means being operatively coupled to said counter, said control means accurately targeting spark instant to said desired instants between said sensor pulses in response to said sensor pulse count provided by said counter.*

*85. A high resolution distributorless electronic ignition system as in claim 84 wherein said system further includes a circuit which detects said reference position in response to said sensor pulses and resets said counter in response to such reference position detection.*

*86. A high resolution distributorless electronic ignition system as in claim 14 wherein said control means includes at least one counter providing a count that is scalable in response to the number of cylinders of said engine.*

*87. A distributorless electronic ignition system as in claim 79 wherein said system includes plural ignition coils, and said system further includes a coil selection circuit coupled to said spark timing circuit, said coil selection circuit selecting a next one of said plural coils for energization in response to said targeted spark instant.*

*88. A distributorless electronic ignition system as in claim 79 wherein said control means includes a first counter circuit for measuring a dwell period, and a second counter circuit operatively coupled to said first counter circuit for controlling an anti-dwell period by targeting coil cut on.*

*89. A distributorless electronic ignition system as in claim 79 wherein said control means includes a counter providing a count that is scaled in response to the number of cylinders of said engine.*

*90. A distributorless electronic ignition control system as in claim 79 wherein said control means is capable of accurately targeting ignition coil cut on at an instant between said sensor pulses.*

*91. A distributorless electronic ignition control system as in claim 79 wherein said control means includes a redundant fire circuit which determines when said spark timing circuit has failed to target spark instant and causes said ignition coil to generate spark at a default crankshaft position responsive to said coil current sense signal.*

*92. A high resolution distributorless electronic ignition control system as in claim 79 wherein said system further includes a circuit which detects said reference position in response to said sensor pulses and resets said counter in response to such reference position detection.*

*93. A high resolution distributorless electronic ignition system for controlling ignition instants within a multi-cylinder internal combustion engine, said internal combustion engine being of the type including a rotating shaft and further including a plurality of cylinders each having a corresponding piston, said pistons being operatively coupled to rotatably drive said shaft in response to occurrence of combustions within said plurality of cylinders, said shaft having at least one reference position defined with respect*

*to said plurality of cylinders, said distributorless electronic ignition control system including:*

*a rotor operatively coupled to rotate with said shaft, said rotor defining a plurality of points angularly spaced about said rotor, said rotor further defining sensible structures disposed on at least some of said points;*

*a single sensor operatively coupled to said rotor, said single sensor producing a train of sensor signals in response to passage of said sensible structures thereby, said sensor signals occurring in response to passage of said sensible structures by said sensor;*

*a counter connected to receive said sensor signals, said counter counting said sensor signals;*

*at least one direct fire ignition coil operatively coupled to said plurality of cylinders;*

*a coil current feedback circuit coupled to said coil for producing an output signal indicating when said coil is charged to a reference level;*

*a spark timing circuit coupled to said counter, said spark timing circuit capable of accurately scheduling coil cut on time and spark instant at times which occur between said sensor pulses in response to said count, said spark timing circuit scheduling coil cut on time to ensure that said coil is sufficiently energized prior to spark instant without being overcharged; and*

*a switching circuit for initiating and disconnecting application of current to said coil in response to said scheduled coil cut on time and said scheduled spark instant, respectively.*

*94. A distributorless electronic ignition system as in claim 93 wherein said spark timing circuit includes a coil on counter and an anti-dwell counter, said coil on counter and said anti-dwell counter each counting during coil charging, said coil on counter providing a count indicative of a time period needed for said coil to charge to said reference level, said anti-dwell counter controlling when said coil is to be energized.*

*95. A distributorless electronic ignition system as in claim 93 wherein said spark timing circuit includes a counter providing a count that is scaled in response to the number of cylinders said engine has.*

*96. A distributorless electronic ignition system as in claim 93 wherein said system provides spark to plural cylinders A and B in a firing order wherein cylinder A is fired before cylinder B, and wherein said first spark timing circuit employs said coil current feedback circuit output signal generated during coil charging for generating spark in said cylinder A to schedule coil cut on for charging said coil to generate spark in said cylinder B.*

*97. A distributorless electronic ignition system as in claim 93 wherein said system includes plural ignition coils, and said system further includes a coil selection circuit for selecting a next of said plural ignition coils to be energized in response to said spark instant.*

*98. A distributorless electronic ignition system as in claim 93 wherein said ignition coil is coupled to plural cylinders, said ignition coil generating a spark causing combustion in one of said plural cylinders and substantially simultaneously generating a spark that does not cause combustion in another of said plural cylinders.*

*99. A distributorless electronic ignition system as in claim 15 wherein said ignition timing means comprises means for providing high resolution measurement of said variable crankshaft arc.*

*100. A distributorless electronic ignition system as in claim 15 further including plural ignition coils, and a coil selection circuit which selects between said plural ignition coils in response to said ignition signal.*

*101. An electronic ignition system as in claim 17 wherein said system is distributorless.*

*102. An electronic ignition system as in claim 17 further including plural ignition coils, and a coil selection circuit which selects between said plural ignition coils in response to ignition signals.*

*103. An electronic ignition system as in claim 56 wherein said spark instant actuating circuit includes means for generating, with high resolution, said spark instant control signal.*

*104. An electronic ignition system as in claim 56 wherein said spark instant actuating circuit includes plural direct fire ignition coils, and a coil selection circuit which selects between said plural direct fire ignition coils in response to said spark instant control signal.*

*105. In a distributorless high resolution electronic ignition system for controlling spark instants within a multi-cylinder internal combustion engine, said internal combustion engine including a rotating shaft and further including a plurality of cylinders each having a corresponding piston, an ignition coil arrangement being operatively coupled to said plurality of cylinders, said ignition coil arrangement including at least one ignition coil, said ignition coil arrangement generating sparks occurring at controlled timings in an ordered sequence of said plurality of cylinders, said sparks causing combustion within said cylinders, movement of said pistons in response to occurrence of combustion within said cylinders being coupled to rotatably drive said shaft, a rotor being operatively coupled to rotate with said shaft, said rotor defining a plurality of points angularly spaced about a dimension thereof, said rotor further defining sensible structures disposed at least some of said points, a sensor operatively coupled to said rotor, said sensor producing sensor signals, said sensor signals occurring in response to registry of said sensible structures with said sensor, a method of facilitating full charging of said ignition coil despite variations in at least one of battery voltage, engine speed and coil arrangement characteristics, said method including the following steps:*

*(a) producing a train of pulses in response to said sensor signals;*

*(b) applying and measuring a charging current to said coil arrangement;*

*(c) counting, in response to said measurement, pulses in said train which occur during the time said coil arrangement is charged to a predetermined percentage of a full charge so as to provide a count, said predetermined percentages being less than 100%;*

*(d) disconnecting said charging current from said coil arrangement so as to trigger a spark instant;*

*(e) storing said count;*

*(f) counting pulses in said train occurring subsequent to said spark instant; and*

*(g) repeating said step (b) beginning at an instant responsive to (i) said spark instant; (ii) said stored count, and (iii) said pulses counted by said counting step (f).*

*106. A method as in claim 105 wherein said coil arrangement includes plural coils, and said method further includes the step of selecting the next of said plural coils to be charged in an ordered sequence in response to occurrence of spark instant.*

*107. A method as in claim 105 wherein said storing step comprises the step of transferring said count to a coil cut-on counter, said counting step (f) comprises the step of causing said coil cut-on counter to change said transferred count in response to pulses in said train, and said repeating step (g) includes the step of applying current to said coil arrange-*

*ment beginning at an instant at which said changed count reaches a predetermined count.*

*108. A method as in claim 107 wherein said predetermined count is zero.*

*109. A system as in claim 15 wherein said missing indicium means includes an arrangement that multiplies a parameter associated with said sensor signals.*

*110. A system as in claim 56 further including a multiplying arrangement connected to receive said detection output signal and coupled to said reference point detecting circuit and to said spark instant actuating circuit, said multiplying arrangement multiplying to provide a parameter associated with said detection output signal.*

*111. A system as in claim 75 further including a multiplier coupled to said reference position determining circuit.*

*112. A system as in claim 75 further including a multiplier coupled to said spark timing circuit, said multiplier for multiplying a parameter associated with said sensor signals.*

*113. A system as in claim 75 wherein said shaft comprises the crankshaft of said internal combustion engine.*

*114. A system as in claim 75 wherein said spark timing circuit targets spark instant to occur at precise desired timings between successive sensor signals, said precise desired timings being responsive to said determined engine speed.*

*115. A system as in claim 75 wherein said counter changes said count upon receipt of sensor signals and resets said count upon detection by said reference position determining arrangement that the shaft has rotated to said reference position.*

*116. A system as in claim 75 further including a pulse generator that generates pulses at a rate that is higher than the rate of the sensor signals, said spark timing circuit generating said spark targeting signal at least in part in response to said pulses.*

*117. A system as in claim 116 wherein said pulse generator is connected to receive said sensor signals and operates to multiply said sensor signal rate.*

*118. A system as in claim 75 further including a signal generator that is connected to receive said sensor signals and produces repetitive signals at a frequency that is proportional to and higher than the rate of said sensor signals.*

*119. A system as in claim 75 wherein said spark timing circuit includes:*

*a backup fire arrangement that targets spark instant to about 12 degrees before top dead center of a particular cylinder in the event that said spark timing circuit is incapable of accurately target spark instant in response to determined engine speed, and*

*means for selecting the number of said plurality of cylinders.*

*120. A system as in claim 75 wherein said spark timing circuit includes a processor which generates a digital spark advance value in response at least in part to said determined speed.*

*121. A system as in claim 79 wherein said spark timing circuit includes a multiplier.*

*122. A system as in claim 79 wherein said crankshaft reference position determining circuit includes a multiplier.*

*123. A system as in claim 93 wherein said spark timing circuit includes a multiplier.*

*124. A method as in claim 105 wherein said step (a) includes multiplying a parameter associated with said train of pulses so as to accurately target triggered spark instant between pulses of said train.*

* * * * *